(12) United States Patent
Anzai et al.

(10) Patent No.: US 8,147,941 B2
(45) Date of Patent: Apr. 3, 2012

(54) MULTI-INFORMATION-LAYER RECORDING MEDIUM AND MANUFACTURING PROCESS

(75) Inventors: Yumiko Anzai, Saitama (JP); Junko Ushiyama, Kokubunji (JP); Toshimichi Shintani, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 870 days.

(21) Appl. No.: 12/169,702

(22) Filed: Jul. 9, 2008

(65) Prior Publication Data

US 2009/0017251 A1    Jan. 15, 2009

(30) Foreign Application Priority Data

Jul. 11, 2007  (JP) .................. 2007-182008

(51) Int. Cl.
*B32B 3/02* (2006.01)
(52) U.S. Cl. .............. 428/64.1; 428/64.4; 430/270.11
(58) Field of Classification Search ............ 428/64.4
See application file for complete search history.

(56) References Cited

U.S. PATENT DOCUMENTS

| 5,871,881 | A | 2/1999 | Nishida et al. | |
|---|---|---|---|---|
| 6,312,547 | B1 | 11/2001 | Fujimori | |
| 6,440,516 | B1 | 8/2002 | Yamasaki et al. | |
| 7,195,691 | B2 * | 3/2007 | Hisada et al. | 156/273.5 |
| 2007/0190242 | A1 | 8/2007 | Tomiyama et al. | |

FOREIGN PATENT DOCUMENTS

| JP | 02-070412 | 3/1990 |
|---|---|---|
| JP | 8-297861 | 11/1996 |
| JP | 9-73671 | 3/1997 |
| JP | 09-128820 | 5/1997 |
| JP | 11-273147 | 10/1999 |
| JP | 2000-268417 | 9/2000 |
| JP | 2003-303449 | 10/2003 |
| JP | 2005-317184 | 11/2005 |
| WO | WO 2005/088629 | 9/2005 |

OTHER PUBLICATIONS

J.M.A. Van Den Erenbeemd, et al., Optical Feasibility Study on a 4-layer Cover-Incident Near-Field Recording System, (2006), Optical Data Storage, Proc. of SPIE vol. 6282.

* cited by examiner

*Primary Examiner* — Elizabeth Mulvaney
(74) *Attorney, Agent, or Firm* — Antonelli, Terry, Stout & Kraus, LLP.

(57) ABSTRACT

In forming a space layer of a multi-formation-layer recording medium, there are provided a medium having a high precision in a thickness of the space layer and its manufacturing process. In the multi-formation-layer recording medium wherein at least two pairs of an information recording layer and a translucency spacer are layered on a substrate having physical patterns composed of an optical spot groove and/or pits on the surface, an average thickness of the translucency spacers in an information zone is 15 μm or less, and a difference in spacer thickness between a minimum value and a maximum value is 2 μm or less.

12 Claims, 13 Drawing Sheets

MULTI-INFORMATION-LAYER RECORDING MEDIUM AND MANUFACTURING PROCESS

CLAIM OF PRIORITY

The present application claims priority from Japanese patent application JP 2007-182008 filed on Jul. 11, 2007, the content of which is hereby incorporated by reference into this application.

BACKGROUND OF THE INVENTION

1. Field of the Invention

The present invention relates to a multi-information-layer recoding medium having a plurality of information layers and its manufacturing process.

2. Description of the Related Art

The following will explain the conventional method for manufacturing an optical disc substrate. A plastic substrate material such as polycarbonate melt at high temperature is injected, with a high pressure, into a mold with a metal stamper placed therein, and thereafter the resultant is cooled and taken out. Then a plastic substrate having physical patterns copied on its surface is completed. This injection molding method (injection method) is one that is generally used in manufacturing plastic substrates for the currently-available media, such as DVD-ROM, DVD-R, DVD-RAM, DVD-RW, Blu-ray Disc, MO, in addition to CD-Audio, CD-R, and CD-ROM. Then, a reflective layer or recording laminated film is deposited on the surface with the physical patterns by sputtering to form an information layer, and a protective layer is formed of ultraviolet (UV) curable resin for protection from damages. As a result, the medium is completed.

As a means for increasing the recording capacity of a medium, there are a method involving increasing a numerical aperture (NA) of a convergence lens and a method involving making an information layer of a medium multilayered. Japanese Patent Application Publication No. Hei 8-297861 discloses an optical recording medium with a four-layer structure in which two substrates, each having two recording layers, are adhered to, and face each other. In a multi-information-layer recording medium, physical patterns including a recessed portion and a protruded portion formed of an optical spot groove and/or pits are required for each information layer. An injection method and 2P method are mainly used to form patterns, but both methods are a pattern transfer method using a stamper as a mother die for pattern transfer. A space, which is required to divide each information layer, is formed as a space layer, and therefore the space layer must be controlled to maintain a desired thickness as well as include physical patterns of the information layer at the same time.

Regarding the space layer manufacturing method, Japanese Patent Application Publication No. Hei 9-73671 discloses a method in which a space layer is formed by a spin coat method using an ultraviolet curable resin. The spin coat method is a method in which liquid is dropped on a portion close to a central hole of a substrate through a nozzle, and the substrate is spun to spread the liquid by centrifugal force, and subjected to curing with ultraviolet light. International Symposium on Optical Memory 2001 Technical Digest, p 312 describes following method. An inner recording laminated film is formed on a thick substrate placed on an opposite side to a light incident side. The formed recording laminated film is coated with ultraviolet curable resin having a good adhesive property. In the meanwhile a polycarbonate stamper is coated with resin having good transferability and releasability from polycarbonate. Both are adhered to each other as being spun and the resultant is cured with ultraviolet light. When the polycarbonate stamper is separated after curing, a pattern is transferred on the surface, so that a recording laminated film close to the light incident side is formed thereon, and a cover layer having a thickness of 0.1 mm is further formed thereon. Japanese Patent Application Publication No. Hei 11-273147 discloses another space layer manufacturing method using a pressure-sensitive adhesive sheet or a dry photopolymer sheet. Since the sheet having a predetermined thickness is used as a space layer, a space layer having no thickness unevenness can be formed. Moreover, a four-layer optical disc having three space layers is reported in International Symposium on Optical Memory 2003 Technical Digest, p 10. Dry photopolymer sheet is used as a space layer material.

Apart from the aforementioned methods, there is another approach having been studied, of increasing the capacity with a high-density recording data obtained by increase of a numerical aperture (NA) of a lens. Generally, the size of a condensed optical spot is proportional to $\lambda/NA$ where a wavelength of an incident light is $\lambda$. In other words, when the wavelength of the incident light is short and NA of the lens is large, the size of the optical spot becomes small, allowing a recoding mark to be reduced in size and high density to be achieved. An attempt has been made to reduce the size of the optical spot by using a lens having NA higher than 1. This type of lens is called as a solid immersion lens (SIL). However, when NA is higher than 1, light having a component of NA>1 among light emitted from the lens is locally present in the vicinity of the light incident surface of the lens without being propagated. The light locally present is called as an optical near field. The optical near field is converted into propagation light when being in contact with a material that allows light to propagate therethrough. For this reason, the SIL must be maintained to be always within about 20 nm from a medium surface in the use of the SIL.

An attempt to combine the SIL with multilayer recording is reported in, for example, Proceedings of SPIE, vol. 6282, 62820Q. This shows a calculation result when four-layer recording is performed using a SIL having NA of 1.6. According to this report, the thicknesses of the medium cover layer and first to third space layers may be 2.0 µm, 2.6 µm, 2.2 µm, and 2.4 µm, respectively. Since NA is high, when an interlayer distance is changed, a signal from an adjacent layer is abruptly reduced. This makes it possible to reduce the interlayer distance. Conversely, when the interlayer distance is large and NA of the lens is high, light cannot be condensed on a point far from the lens. Though the lens diameter must be enlarged to condense the lens on the point far therefrom, enlargement in lens increases weight of the lens, thus making it impossible to move the lens at high speed. This causes, for example the lens and the medium to collide with each other, since a distance between the lens and the medium is not controlled at high speed.

SUMMARY OF THE INVENTION

To record and reproduce all information layers of the multilayer medium accurately, it is important that spherical aberration, which is caused when an optical distance between layers changes, be suppressed within an allowable value. From a practical point of view, since spherical aberration correction amount is finite, the number of layers of the multilayer medium is limited. For example, when recording and reproducing by a device having a maximum spherical aberration correction amount of 45 µm, it is preferable that a thickness of each layer be ranged within 45 µm. In the case of a five-layer disc, the thickness of each layer is about 10 µm, and namely, the thickness must be considerably thinned as compared with the space layer having a thickness of 25 μm that is currently used in Blu-ray Disc.

The thinner the space layer becomes, the higher the accuracy of thickness evenness is required. Therefore a reduction in thickness unevenness is essential. For example, in the case of two-layer disc of Blu-ray, an allowable range of thickness unevenness for a combination of the space layer and the cover layer is ±4 μm and a maximum difference therebetween is 8 μm. For instance, if the value is divided into two, for the space layer and the cover layer, the allowable range of each layer is ±2 μm and the maximum difference therebetween is 4 μm. Moreover, when the number of layers is increased by forming a multilayer, an allowable range of thickness unevenness per layer becomes more severe with an increase in the number of layers. To put it in other way, in the case of three layers, an allowable range of thickness unevenness per layer is 2.66 μm that is obtained by dividing a maximum difference of 8 μm into three. Likewise, in the case of four layers, an allowable range of thickness unevenness per layer is 2 μm, in the case of five layers, an allowable range of thickness unevenness per layer is 1.6 μm, in the case of six layers, an allowable range of thickness unevenness per layer is 1.33 μm, and in the case of eight layers, an allowable range of thickness unevenness per layer is 1 μm, and therefore it is difficult to manufacture the thin space layer evenly and accurately. As mentioned above, the thickness of the space layer is decreased as the number of layers is increased. For example, when the device having a maximum spherical aberration correction amount of 45 μm is used, in the case of three-layer, four-layer, five-layer, six-layer and eight-layer discs, average thicknesses of space layers of the respective discs are 22.5 μm, 15.0 μm, 11.2 μm, 9.0 μm, and 6.4 μm, respectively. Though the average thickness of space layers with respect to the number of layers and design of the cover layer are different depending on the differences in spherical aberration correction amount and device performance, forming thin space layers evenly still remains difficult. In consideration of difficulty in handing the thin space layers, a multilayer medium process is suitable where a space layer and an information layer are sequentially superposed on a substrate having a basic thickness (for example, about 1 mm).

Problems which arise when the thin space layers are formed are a plate thickness distribution, warp, burr, and the like attributable to a polycarbonate substrate that is inject-molded by an injection. In a plastic injection molding in which no surface polishing is performed, it is extremely difficult to suppress plate thickness unevenness to several nm, thus causing unevenness of at least several μm. Likewise, regarding the warp and burr, it is difficult to require accuracy equivalent to that of, for example, Si wafer. In the case of performing pattern transfer using this type of substrate, when a flat and hard stamper, serving as a mother mold, is used, a space layer, which is formed so as to be sandwiched between the substrate and the stamper, is affected by plate thickness distribution, warp, burr attributable to the substrate itself, thus causing unevenness of spacer thickness. When the stamper is warped, thickness unevenness is caused in the space layer by influences of both the stamper and the substrate. In the case of forming a thick space layer, these influences attributable to the polycarbonate substrate exerted on the space layer was small, and therefore no problem was caused. Moreover, in the case of a DVD two-layer disc having a space layer in average thickness of 55 μm, an allowable range of thickness unevenness was large enough such as 45 μm to 65 μm, and therefore no problem was caused in this point.

FIG. 1 shows an example of a result of a plate thickness measured by a micro gauge, the thickness being of a polycarbonate substrate manufactured by the injection method. Measurement was performed near a radius of 55 mm of the substrate with a diameter of 120 mm at 12 points in a circumferential direction. In the case of a substrate having a thickness of 0.6 mm, an average thickness was 604 μm and a difference in thickness between a minimum value and a maximum value was 9 μm. In the case of a substrate having a thickness of 1.1 mm, an average thickness was 1099 μm and a difference in thickness between a minimum value and a maximum value was 8 μm. Simply judging from the result, a maximum gap is 17 μm between the substrate having a thickness of 1.1 mm and the substrate having a thickness of 0.6 mm which is obtained by combining them (either one of them is used as a stamper), and when a space layer is formed using this gap, this results in unevenness of spacer thickness. Even when a Ni stamper having a flat plate thickness is used, unevenness of plate thickness of one substrate remains, and by this influence, unevenness of spacer thickness is caused.

FIG. 2 shows an example of a result of measured thickness unevenness in an information zone with respect to a thickness of space layer on two-layer disc manufactured. A polycarbonate substrate having a thickness of 1.2 mm manufactured by the injection method was used as a substrate and a polyolefin substrate having a thickness of 0.6 mm was used as a stamper. Ultraviolet curable resin was used as a space layer material and space layers were formed by 2P method using spin coat.

The spacer thickness was measured using a laser displacement meter manufactured by Keyence Corporation (LT-9000: laser wavelength of 408 nm, maximum output of 0.9 mW). Regarding 100 discs each having a diameter of 120 mm, thicknesses of 408 points in total including 24 locations in a circumferential direction were measured in an information zone range between radii 23 mm to 59 mm, every 2 mm, and a difference between a minimum value and a maximum value was taken as thickness unevenness. When the average thickness of space layers to be formed was 25 μm to 20 μm, thickness unevenness was able to be within 2 μm or less. However, when the average thickness of space layers was 15 μm or less, thickness unevenness was increased. An increase in unevenness of spacer thickness makes interlayer switching unstable and adversely affects a jitter and an error rate characteristic.

In the case of a multilayer SIL, an interlayer distance is small, such as 2 to 3 μm. In addition, SIL has a high NA, and therefore a change in signal quality due to a variation in interlayer distance is large. For this reason, interlayer thickness unevenness must be reduced.

It is an object of the present invention is to provide a multi-information-layer recording medium in which thickness unevenness is small even in a thin film translucency stamper having a thickness of 15 μm or less and its characteristic is good and to provide its manufacturing process.

<Medium>

A multi-information-layer recording medium of the present invention includes: a plastic substrate being manufactured by an injection method, the plastic substrate having physical patterns on its surface, a first information recording layer formed on the substrate, and at least one set of a translucency spacer, being layered on the first information recording layer and having physical patterns on its surface, and an information recording layer formed on the translucency spacer, wherein an average thickness of the translucency spacer in an information zone is not more than 15 μm and a difference between a minimum value and a maximum value in a thickness of the translucency spacer is not more than 2

μm. By this means, it is possible to obtain a multi-information-layer recording medium having a target error rate of $1\times10^{-5}$ or less which is required for practical use.

Moreover, in consideration of a spherical aberration correction range by a drive, the difference in the thickness between the minimum value and the maximum value is preferably 1 μm or less. When the difference in thickness between the minimum value and the maximum value is 1 μm or less, total thickness unevenness between an information layer closest to a laser irradiation side and an information layer farthest therefrom is within 3 μm in the four layers and within 4 μm in the five layers. Therefore, since these values are less than a thickness allowable range of the current BD, there is an advantage that these values can be sufficiently handled by the current drive. More preferably, it is desirable that the difference in thickness between the minimum value and the maximum value is preferably 0.8 μm or less. The difference in thickness between the minimum value and the maximum value is more preferable within 0.8 μm or less, since this makes a large effect on suppressing occurrence of a so-called ghost spot where focus would be achieved on a detector as in the original reproduced signal to generate serious interlayer crosstalk, which is unique to the multilayer medium having three or more information layers.

When the average thickness of the translucency spacers in the information zone is 12 μm or less, the difference in thickness between the minimum value and the maximum value is 1.8 μm or less. When the average thickness of the translucency spacers in the information zone is 8 μm or less, the difference in thickness between the minimum value and the maximum value is 1 μm or less. When the average thickness of the translucency spacers in the information zone is 6 μm or less, the difference in thickness between the minimum value and the maximum value is 0.7 μm or less. When the average thickness of the translucency spacers in the information zone is 3 μm or less, the difference in thickness between the minimum value and the maximum value is 0.5 μm or less.

Forming at least one layer of the translucency spacers to have a layered structure where a plurality of layers are laminated, makes it possible to obtain a multi-information-layer recording medium having improved adhesiveness of the space layer to the information layer and a long lifetime characteristic.

Furthermore, forming the substrate to have a layered structure having at least two materials, dividing these materials into a base material and physical patterns transfer layer, and selecting material suitable for each, make it possible to faithfully transfer fine physical patterns and obtain a substrate having an information layer with higher density.

<Manufacturing Process>

A multi-information-layer recording medium manufacturing process of the present invention includes the steps of: molding a plastic substrate having physical patterns on a surface by an injection method; depositing a first information layer on the substrate; superposing a flexible sheet stamper on the first information layer with a liquid ultraviolet curable resin layer sandwiched therebetween, the flexible sheet stamper having a thickness of not less than 0.085 mm and not more than 0.27 mm, a translucency, and physical patterns formed on its lower surface; spinning the substrate with the ultraviolet curable resin layer sandwiched between the stamper and the substrate so as to adjust a thickness of the ultraviolet curable resin layer; irradiating the ultraviolet curable resin layer with ultraviolet light through the stamper so as to cure the ultraviolet curable resin layer; separating the stamper; and depositing an information layer on a translucency spacer formed of the cured ultraviolet curable resin layer, wherein the step of depositing an information layer on the translucency spacer is repeated to form a plurality of information layers separated from one another by the translucency spacer. By this process, it is possible to form a translucency spacer without being adversely affected by thickness unevenness, warp, burr or the like attributable to the substrate.

Since an organic compound is used as a material to make a thin film translucency stamper, a stamper is obtained having a thin thickness but high flexibility, strength and durability. The thin film translucency stamper is formed of mainly an organic compound and is formed to have a laminated structure of the organic compound and any one of an organic compound and an inorganic compound, thereby reducing stress applied to separation at the time of transferring the physical patterns, resulting in an increase in stamper lifetime.

<Manufacturing Apparatus>

An apparatus that manufactures a multi-information-layer recording medium manufacturing process of the present invention includes a means for depositing a film on a substrate having physical patterns formed of an optical spot groove and/or pits on its surface, a means for superposing a translucency spacer material, the substrate, and a thin film translucency stamper on one another, and a means for separating the thin film translucency stamper. The apparatus also includes at least two means out of a spinning means, an ultraviolet light irradiation means, a pressurization means, a heating means, and a decompression means. The present invention achieve to form an even space layer in which the thickness unevenness in the information zone is 2 μm or less, even for the space layer having thickness of 15 μm or less.

According to the present invention, it is possible to obtain a multi-information-layer recording medium wherein a space layer having thickness unevenness of 2 μm or less is formed even in a space layer having a thickness of 15 μm or less to thereby provide a stable interlayer switching and an excellent characteristic.

DETAILED DESCRIPTION OF THE PREFERRED EMBODIMENTS

The following will explain an embodiment of the present invention with reference to the drawings.

Figure 3A:
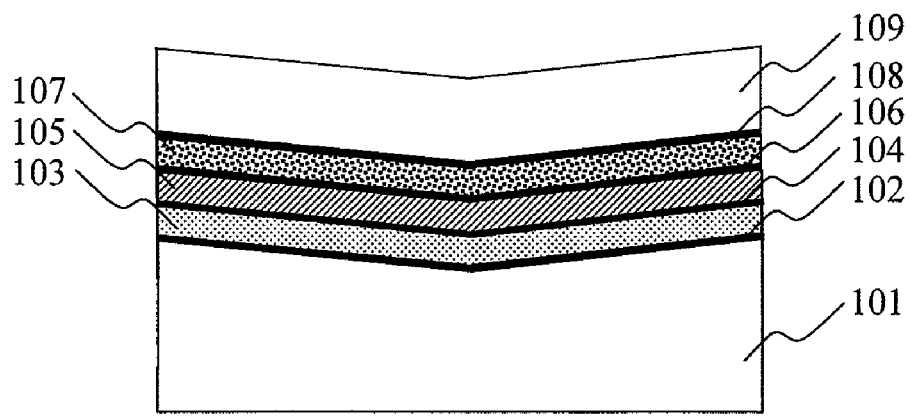
FIGS. 3A and 3B are cross-sectional views showing examples of a multi-information-layer recording medium according to the present invention.
Figure 3B:
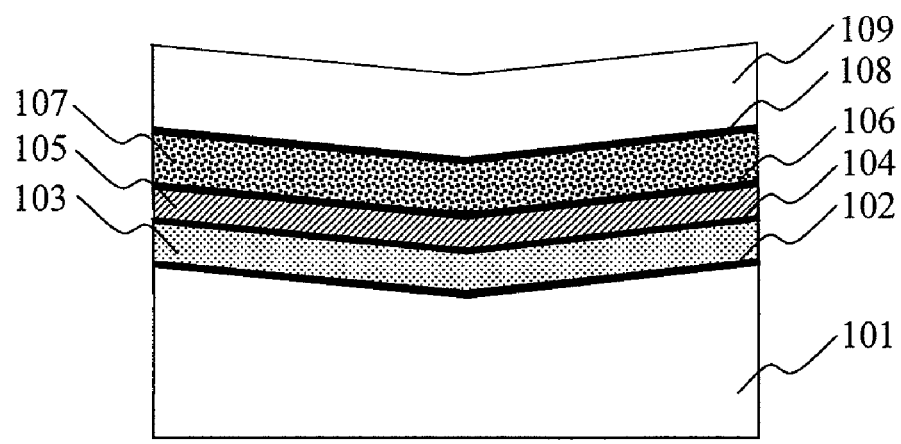

FIG. 3A and FIG. 3B show part of a cross-sectional structure of a manufactured multi-information-layer recording medium, respectively. The structure is formed including four information layers 102, 104, 106 and 108 on a substrate 101 with a cover layer 109 being formed thereon. Translucency spacers 103, 105, 107 are respectively sandwiched in between the information layers 102, 104, 106, and 108. FIG. 3A shows a structure where the thickness of each spacer is substantially the same one another and FIG. 3B shows a structure where the thickness of each spacer is different from one another.

FIGS. 4A to 4I, and FIG. 5 show a manufacturing process and a manufacturing flow, respectively. The manufacturing process to be explained here is applicable to not only a medium where the thickness of each spacer is substantially the same one another shown in FIG. 3A but also a medium where the thickness of each spacer is different from one another shown in FIG. 3B. Additionally, here, the following will explain a medium having a ROM film as one example.

Figure 1:
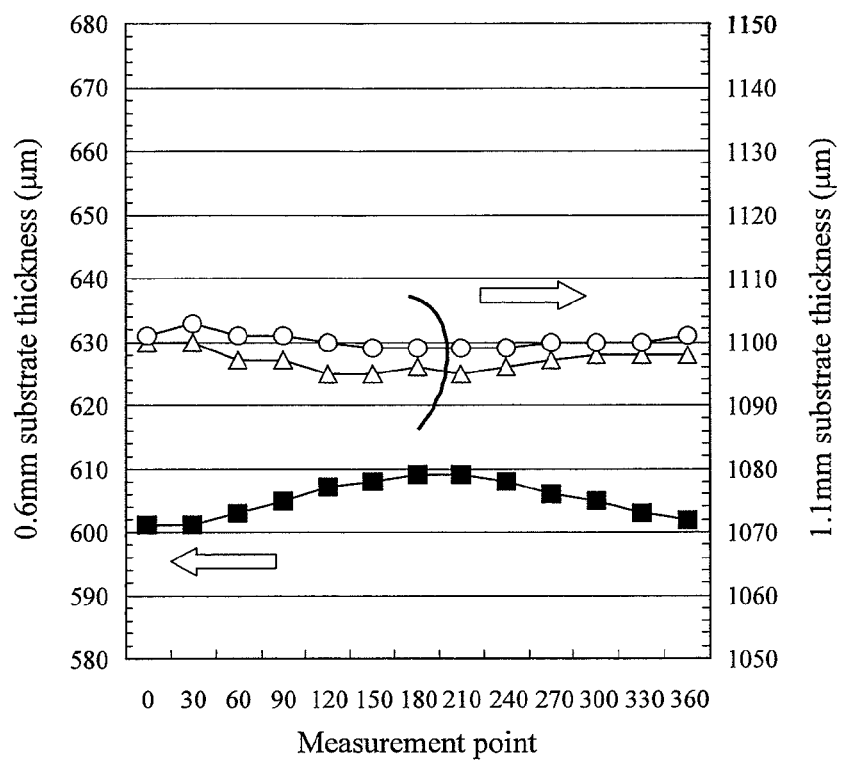
FIG. 1 is a view showing an example of thickness unevenness of a substrate manufactured by an injection method.
Figure 2:
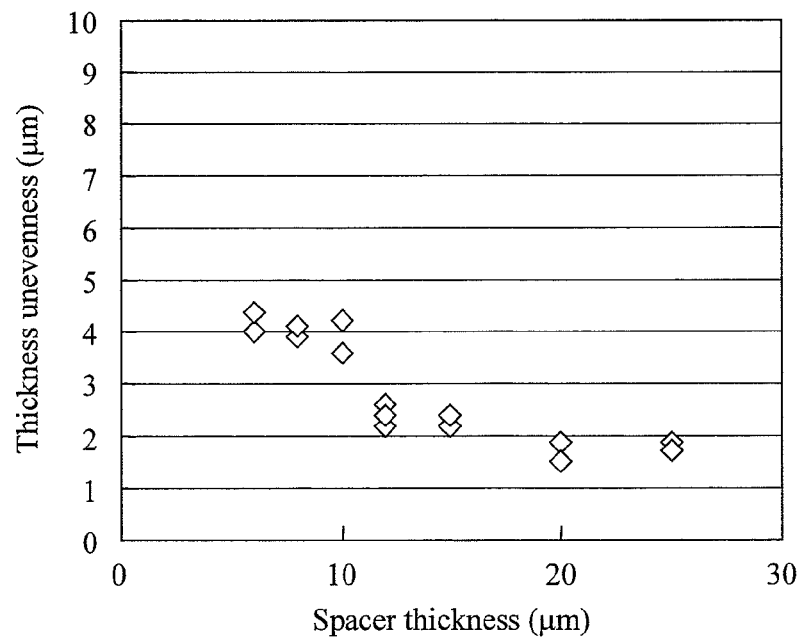
FIG. 2 is a view showing an example of thickness unevenness attributable to a spacer thickness according to a conventional method.
Figure 4A:
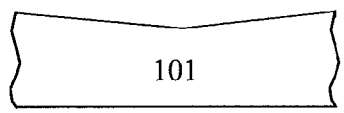
FIGS. 4A to 4I are cross-sectional views showing an example of a multi-information-layer recording medium manufacturing process according to the present invention.

First, as shown in FIG. 4A, a polycarbonate substrate 101 was molded by a general injection method to obtain a substrate having physical patterns on a surface, the physical patterns composed of an optical spot groove and/or pits (S11). The diameter of the polycarbonate substrate 101 is 120 mm and the thickness thereof is 1.1 mm. Moreover, FIG. 1 shows examples of a measurement result of substrate thickness measured by a micro gauge. Measurement was performed on the substrate with a diameter of 120 mm, around 55 mm of a radius at 12 points in a circumferential direction. In the case of a substrate having a thickness of 1.1 mm, an average thickness was 1099 μm and a difference between a minimum value and a maximum value was 8 μm. Measurement result was also shown in the case of a substrate having a thickness of 0.6 mm, an average thickness was 604 μm and a difference between a minimum value and a maximum value was 9 μm. These substrates are manufactured for the purpose of the known DVD and BD by an injection method, and have no problem in thickness unevenness in view of the normal use of DVD, BD, etc.

Figure 4B:
Figure 4C:
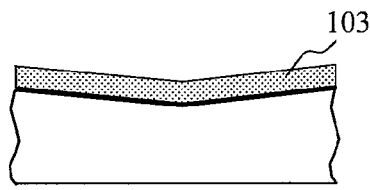
Figure 4D:
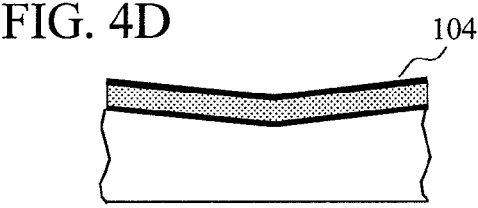
Figure 4E:
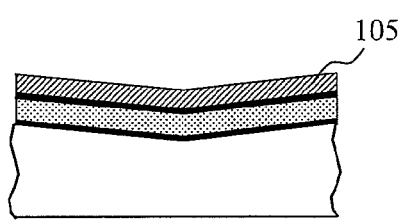
Figure 4F:
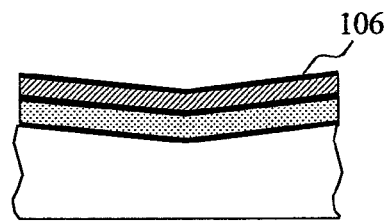
Figure 4G:
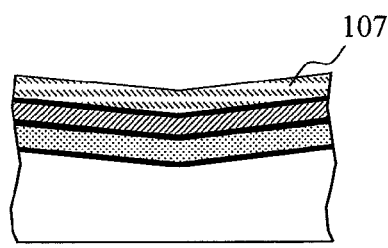
Figure 4H:
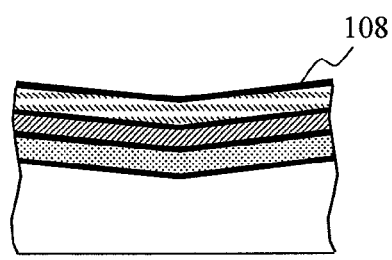
Figure 4I:
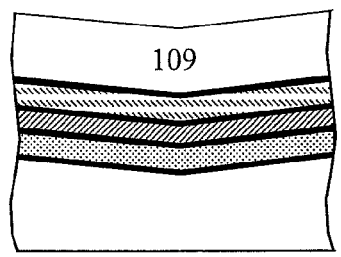
Figure 5:
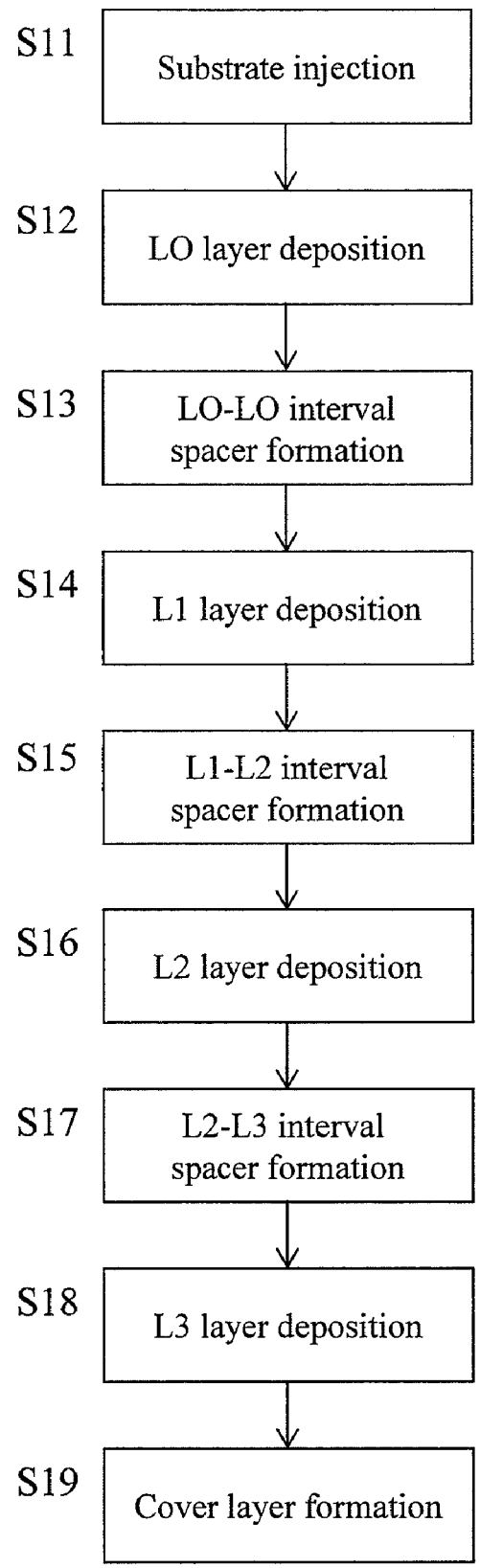
FIG. 5 is a view showing a multi-information-layer recording medium manufacturing flow according to the present invention.

Next, as shown in FIG. 4B, an Ag alloy having a thickness of 50 nm was deposited on the polycarbonate substrate 101 by sputtering to form an information layer 102 (S12). Sequentially, as shown in FIG. 4C, a translucency spacer 103 having a thickness of 15 μm was formed (S13). On a surface of the spacer, there is formed a pit pattern corresponding to data of an information layer 104. Next, as shown in FIG. 4D, an Ag alloy having a thickness of 15 nm was deposited on the surface by sputtering to form an information layer 104 (S14). Sequentially, as shown in FIG. 4E, a translucency spacer 105 having a thickness of 9 μm was formed. On a surface of the spacer, there is formed a pit pattern corresponding to data of an information layer 106 (step S15). As shown in FIG. 4F, an Ag alloy having a thickness of 10 nm was deposited on the surface by sputtering to form an information layer 106 (S16). Moreover, as shown in FIG. 4G, a translucency spacer 107 having a thickness of 12 μm was formed (S17), and as shown in FIG. 4H, an Ag alloy having a thickness of 5 nm was deposited by sputtering to form an information layer 108 (S18). On a surface of the spacer 107, there is formed a pit pattern corresponding to the information layer 108. Finally, as shown in FIG. 4I, a cover layer 109 having a thickness of 55 μm was formed (S19).

Figure 6A:
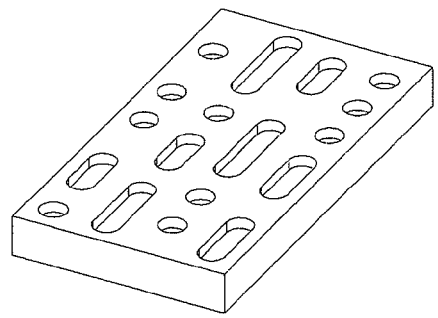
FIGS. 6A to 6G are views showing examples of physical patterns according to the present invention.
Figure 6B:
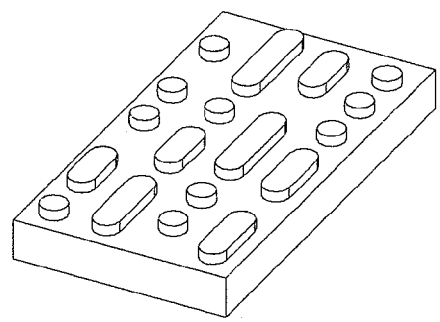
Figure 6C:
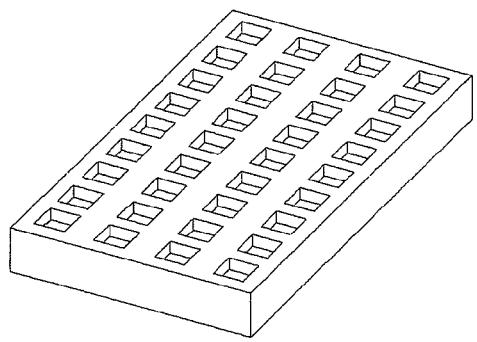
Figure 6D:
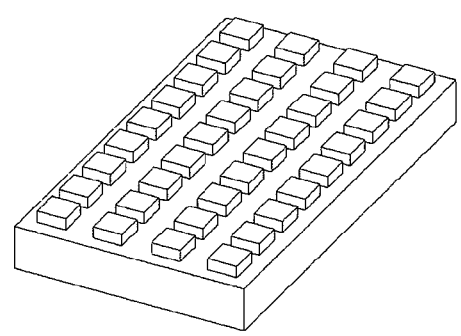
Figure 6E:
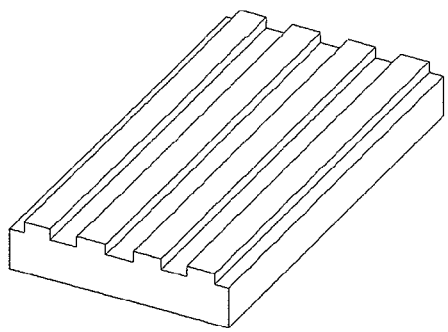
Figure 6F:
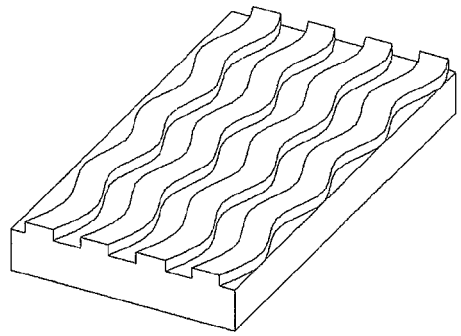
Figure 6G:
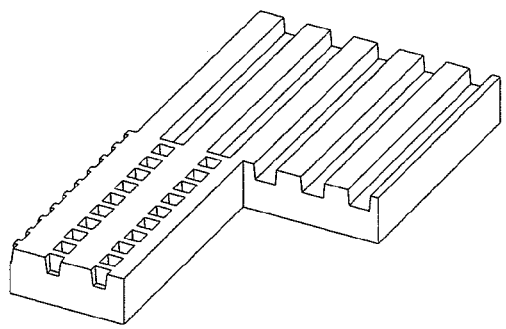

FIGS. 6A to 6G show pit pattern examples. A combination of FIGS. 6A and 6B as well as a combination of FIGS. 6C and 6D are both showing examples of pit patterns in which one parts of the combination have recessed portions, and the other parts thereof have protruded portions. In addition to the bit pattern, FIGS. 6E and 6F show examples of line pattern. An example of a mixed pattern is shown in FIG. 6G, but the mixed pattern is not limited to the one in FIG. 6G. Such pattern as shown in FIGS. 6A and 6E can be mixed or such pattern as shown in FIGS. 6A and 6F can be mixed.

Figure 7A:
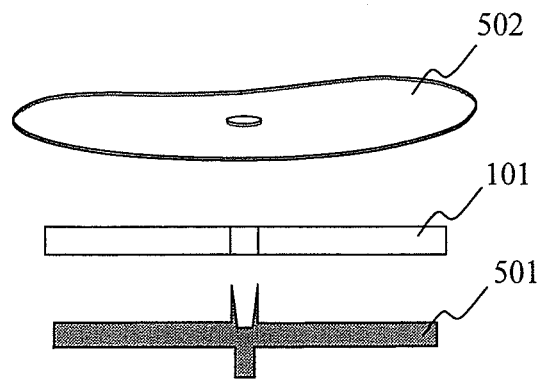
FIGS. 7A and 7B are cross-sectional views showing an example of component parts that form a translucency spacer according to the present invention.
Figure 7B:
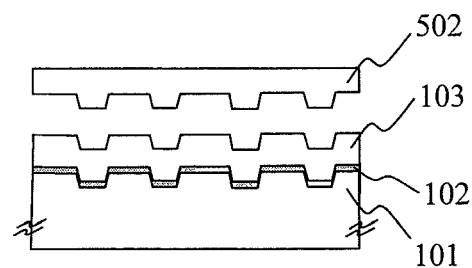

FIG. 7A shows members to be used in a process for forming a space layer (process for transferring a pattern). The substrate 101 with an information layer is placed on a base 501. Material served as a space layer is being sandwiched between the substrate 101 and a thin film translucency stamper 502 served as a mother die until the material is cured. Thereafter the material is separated from the thin film translucency stamper 502 at a boundary, then a space layer on which a pattern is transferred is formed. A schematic view of a pattern transfer is shown in FIG. 7B. Physical patterns serving as the information layer (104) transferred onto the surface of the spacer 103 correspond to patterns in which recessed and protruded portions of the thin translucency stamper 502 are inverted.

Figure 8A:
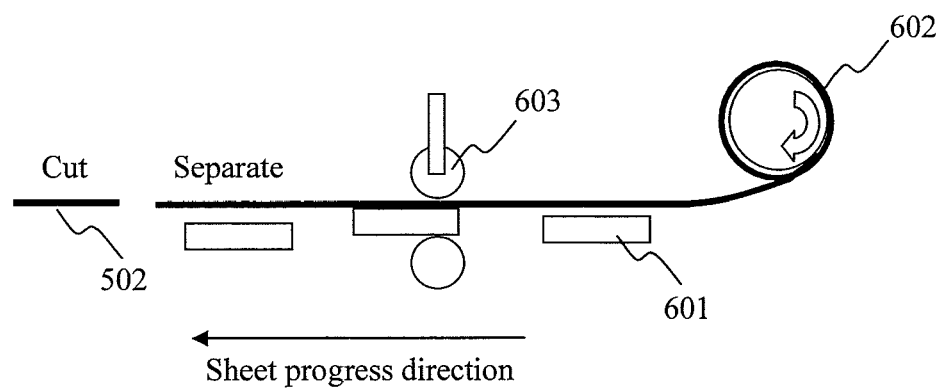
FIGS. 8A and 8B are cross-sectional views showing an example of a thin film translucency stamper manufacturing process according to the present invention.

FIG. 8A shows a thin film translucency stamper manufacturing process when polycarbonate having a thickness of 0.1 mm is used as a stamper material. As in the conventional manner, a Ni stamper is made by electroforming by use of a master which is obtained by performing exposure to a resist and development. After that, a polycarbonate sheet 602 having a thickness of 0.1 mm is pressed on a Ni stamper 601 by heating with the use of pressurizing roller 603. Heating and pressurizing soften a surface of the thermoplastic polycarbonate sheet, and the surface of the polycarbonate sheet is formed into a pattern of the Ni stamper 601. After that, the naturally-cooled polycarbonate sheet 602 was separated from the Ni stamper 601. Accordingly a thin film translucency stamper 502, having the pattern of the Ni stamper transferred thereon, was obtained. A surface temperature of the pressurizing roller 603 desirably ranges from 35° C., which is higher than room temperature, up to 175° C. at which soft material such as rubber does not deform. When a process for superposing the stamper and the polycarbonate sheet on each other is performed in a reduced-pressure atmosphere, a stamper with fewer defects caused by air bubbles can be obtained.

Figure 8B:
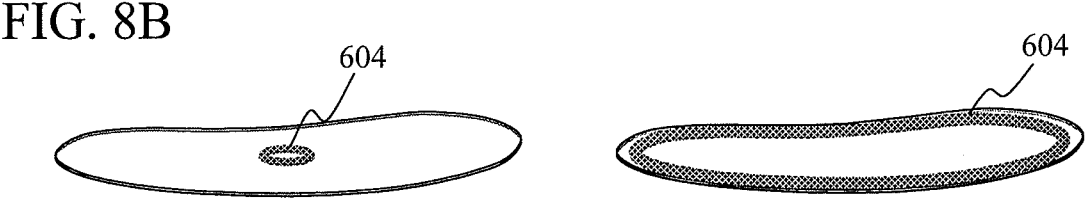

An inner peripheral and/or outer peripheral processing may be performed depending on a required size. In addition, it is also possible to reduce mismatch degree of the center cores between a processing center and a pattern center. The mismatch degree of the center cores can be easily reduced by adding marks or performing additional processing to processing positions before the Ni stamper is separated from the polycarbonate sheet. In this case, at the time of transferring physical patterns as a multi-information-layer recording medium, an inner periphery and/or outer periphery is superposed on the substrate as a guide so that the mismatch degree of the center cores can be adjusted. Further, as shown in FIG. 8B, it is more effective that a reinforcing hub 604 is mounted on an inner peripheral and/or outer peripheral portion after processing. As material of the reinforcing hub 604, a metal or a plastic may be used. The reinforcing hub and the stamper are superposed on each other with adhesive sandwiched therebetween and are pressurized. In a case where ultraviolet curable resin is used as adhesive, a translucent plastic material is preferable. They can be adhered to each other instantaneously by ultraviolet light irradiation. In addition to this, when a two-liquid mixed type such as Araldite, instantaneous adhesive or the like is used, an opaque, metallic material may be also used. In a case where a metallic material attracted to a magnet is used, feeding efficiency is improved since the stamper can be handled with the magnet.

Polyolefin (ZEONOR1420: made by Zeon Corporation) was able to be used as another example of the stamper material. This material, which is resistant to solvent, has an excellent releasability from the spacer, widens the range of selection for a spacer material, and has a long lifetime as the stamper. This material was equivalent to the polycarbonate in condition in transferability from the Ni stamper and in the condition for manufacturing the multilayer medium.

To improve the lifetime as the stamper, an $Al_2O_3$ film having a thickness of 10 nm was formed on its surface as a protective layer. Deposition with sputtering provided high adhesiveness of the $Al_2O_3$ film to the polycarbonate and an effect as a stamper protective layer was obtained. In addition to $Al_2O_3$, a film, having an excellent releasability from the spacer material, such as ZnS $SiO_2$, $SiO_2$ or the like, is preferably formed, thereby reducing damage due to repetition of separation, resulting in extension of lifetime as the stamper. Slight adjustment is required for the thickness of the protective layer depending on the size of the physical patterns. For example, in the case of a micropit, a thick layer would make a pit size different from the original pit size. For this reason, the thickness of 20 nm or less is appropriate, and in the case of the micropit having a diameter of 50 nm or less, the thickness of the protective layer is preferably 10 nm or less.

Figure 9:
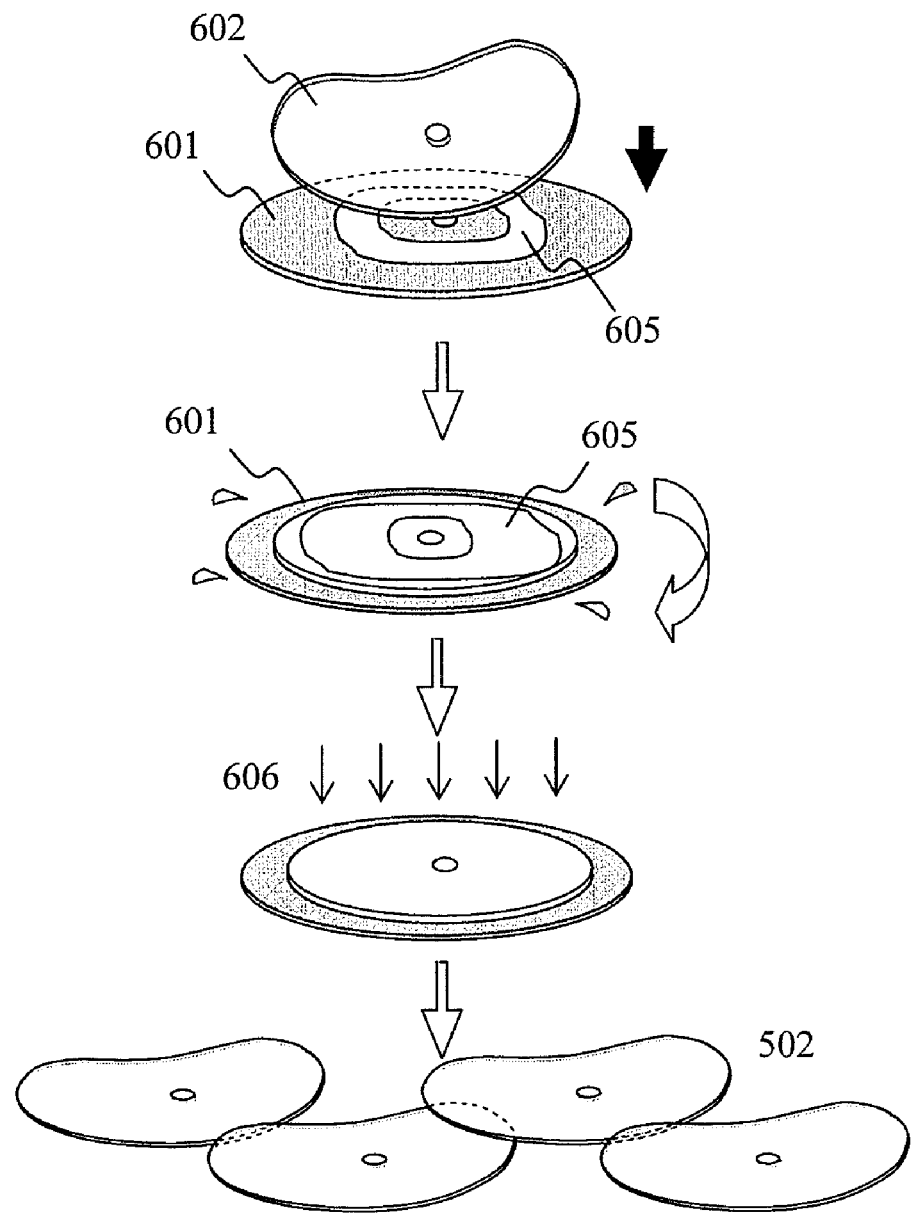
FIG. 9 is a view showing an example of a thin film translucency stamper manufacturing process according to the present invention.

Furthermore, it is possible to use a two-layer structure having polycarbonate with a thickness of 0.1 mm and ultraviolet curable resin as a thin film translucency stamper. Using ultraviolet curable resin in physical patterns transfer portion from the Ni stamper allowed finer physical patterns to be transferred. In this case, as shown in FIG. 9, the Ni stamper 601 and the polycarbonate sheet 602 having a thickness of 0.1 mm were superposed on each other with HOD3200 (manufactured by Nippon Kayaku Co., Ltd.) served as ultraviolet curable resin 605 sandwiched therebetween, and the resultant was spun to improve evenness of the film thickness by centrifugal force, and thereafter the resultant was irradiated with ultraviolet light 606 having illuminance of 1200 $mJ/cm^2$ from the polycarbonate side and was cured, and thereafter the resultant was separated from the Ni stamper and physical patterns were transferred thereon. Ultraviolet illuminance was measured using UVPF-36 illuminance meter manufactured by Eyegraphics Co. Ltd. Separation is carried out by warping the stamper, and the warping may be performed from the outer periphery of the stamper or from the inner periphery thereof in a floating manner. Moreover, a separation method may be used where the stamper is separated by being vacuum-sucked so as to reduce stress on the thin stamper, instead of being warped. Furthermore, a method may be used where separation is carried out using magnetic chucking for a reinforcing hub. The thickness of the ultraviolet curable resin was 0.8 to 1.2 μm. Repetition of transfer from the mother die made it possible to manufacture a large number of thin film translucency stampers 502.

Moreover, the thin film translucency stamper was able to be manufactured similarly with a method in which the ultraviolet curable resin was spin-coated on the Ni stamper in advance and the resultant was superposed on the polycarbonate and pressurized in a reduced pressure atmosphere. This method provides an advantage in reducing defects of air incorporation and in shortening spin-coating time. Likewise, irradiation of ultraviolet light was performed after superposing, and curing was carried out, and thereafter separation from the Ni stamper was performed.

Furthermore, it was possible to use a master before a Ni stamper was not yet electroformed as a mother die in transferring physical patterns. When using a Si master having its surface good releasability, a Si mater having $SiO_2$ formed thereon or a quartz master, transfer could be performed similarly. When releasability is poor, a film such as $Al_2O_3$, ZnS $SiO_2$, $SiO_2$ or the like may be formed on the surface.

Translucency of the thin film translucency stamper is only required to allow the light required for curing a light curing spacer material to transmit therethrough. As a light source for use in curing, such lamp as a high pressure mercury lamp, a chemical lamp, a metal halide lamp or the like may be applicable.

Figure 10A:
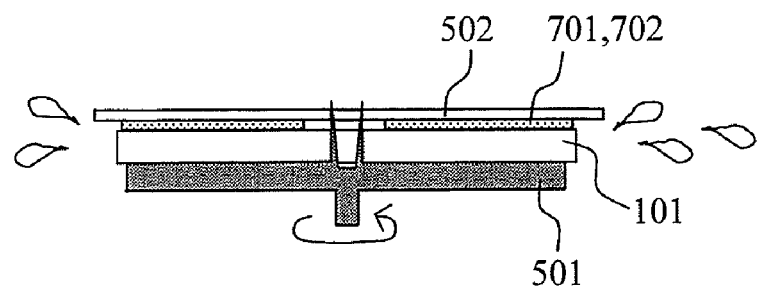
FIGS. 10A to 10C are cross-sectional views showing an example of a manufacturing method of a multi-information-layer recording medium according to the present invention.

As an example of the spacer material, there was used liquid ultraviolet curable resin PC-2 (manufactured by Dainippon Ink and Chemicals Co., Ltd.). As shown in FIG. 10A, liquid ultraviolet curable resin 701 and 702 is sandwiched between the substrate 101 and the thin film translucency stamper 502 having a thickness of 0.1 mm. Then an extra resin is removed by spinning the base 501 with the substrate 101 mounted thereon, thereby a desired thickness can be obtained. The thickness of the spacer can be obtained by controlling the number of revolutions and time in accordance with viscosity of the ultraviolet curable resin to be used. In case of the resin having viscosity of 180 cps, for example, an average thickness obtained was 5 μm after the revolution at 5000 rpm for 60 seconds, and was 8 μm after the revolution at 3000 rpm for 60 seconds. Corresponding to the viscosity and the spin condition, there is a point where the thickness remains almost unchanged even if spinning is further continued after the extra resin is removed. Therefore the spin condition is applicable where thickness unevenness of a desired thickness becomes 2.0 μm or less.

Figure 11:
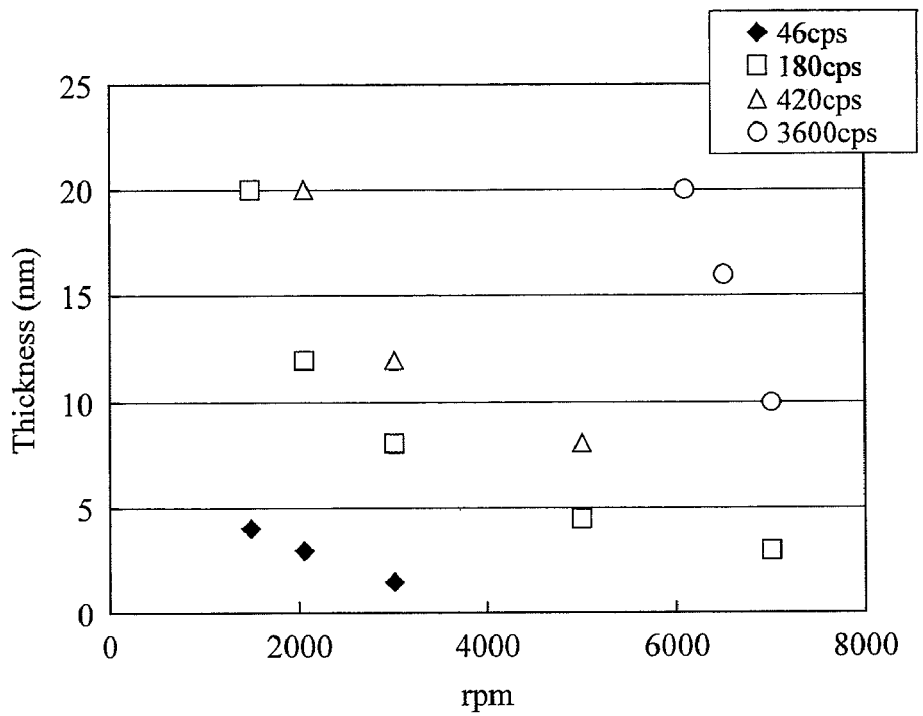
FIG. 11 is a reference view showing change in thickness corresponding to a viscosity and the number of revolutions.

As an example, FIG. 11 shows a change in an average thickness corresponding to the viscosity and the number of revolutions. The number of revolutions may be adjusted according to a desired film thickness. As shown in FIG. 11, the ultraviolet curable resin is moved outside by centrifugal force as the number of revolutions becomes large, so that the film thickness becomes thin. Therefore the number of revolutions may be increased as the viscosity becomes high.

Further, in this case, the two-layer structure of ultraviolet curable resin was used to improve an adhesive property. The aforementioned PC-2 was used as the ultraviolet curable resin 701, which was once in contact with the stamper 502 and cured, and thereafter being separated therefrom, and the substrate side 101 was previously spin-coated with HOD3200 (manufactured by Nippon Kayaku Co., Ltd.), having a good adhesive property, as the ultraviolet curable resin 702 and the resultant was used in a semi-cured state. The resin layer may be one-layered depending on the ultraviolet curable resin. First of all, the substrate side 101 is coated with HOD3200 (manufactured by Nippon Kayaku Co., Ltd.) in a spin condition where the thickness of 1 μm can be obtained, and the resultant is irradiated with ultraviolet light having illuminance of 600 mJ/cm². After that, PC-2 was sandwiched between the resultant substrate side 101 and the stamper 502 and the resultant 1 was spin-coated in a spin condition where a desired thickness was obtained. Thereafter the resultant was irradiated again with ultraviolet light having illuminance of 1200 mJ/cm². Since anaerobic ultraviolet curable resin is used as ultraviolet curable resin for the substrate side, an ultraviolet illuminance margin for a semi-cured state is high.

In the case of the thin film translucency stamper, even if the surface is not flat, the ultraviolet curable resin sandwiched between the substrate and the thin plate stamper flows naturally according to the spin condition, and therefore it is possible to form a space layer having an even thickness without being adversely affected by thickness unevenness, warp, burr or the like attributable to the substrate.

In a typical conventional process for manufacturing two layers of a Blu-ray disc, a spin method is used where ultraviolet curable resin is employed as a space layer and a translucency stamper having a thickness of 0.6 mm (for example, polycarbonate) is used as a stamper. The thickness of the space layer in this case ranges from 20 μm to 30 μm and the allowable range of a difference in thickness between a minimum value and a maximum value is 4 μm. However, in the manufacture of multilayer medium by the conventional process, it was not possible to meet a requirement in performance where the allowable range of a difference in thickness between a minimum and a maximum value is 2 μm or less when forming a thin space layer having an average thickness of 15 μm or less. Therefore the thin film translucency stamper of the present invention was used. Accordingly, the following embodiment will describe the result of manufacturing the multilayer medium having a spacer thickness of 15 μm or less in average.

Table 1 shows a evaluation result of unevenness of spacer thickness corresponding to stamper materials and stamper thickness. Table 1 is a result of evaluating a four-layer disc manufactured using each stamper. A laser displacement meter manufactured by Keyence Corporation (LT-9000: laser wavelength of 408 nm, maximum output of 0.9 mW) was used as a method for measuring a spacer thickness. Ni, Si, polycarbonate, and polyolefin were employed as stamper materials. The respective space layers were manufactured using the thicknesses of the respective stampers, that is, 0.3 mm in the Ni stamper, 0.6 mm in the Si stamper, and 1.2 mm, 0.6 mm, 0.4 mm, 0.3 mm, 0.27 mm, 0.2 mm, 0.1 mm, 0.085 mm, 0.05 mm, 0.04 mm, and 0.02 mm in the polycarbonate and polyolefin stampers. Ultraviolet curable resin was used as the space layer material and manufacturing was performed by the spin method.

In an information zone range of the respective translucency spacer formed on the substrate, thicknesses of 456 points in total were measured at 24 locations in a circumferential direction per every 2 mm between radii 23 mm to 59 mm, and a difference between a minimum value and a maximum value was taken as thickness unevenness. Evaluation was performed based on an average of measurement results of the space layers each having an average thickness of 15 μm or less. The thickness unevenness of less than 1.00 μm was indicated by "⊚", that of 1.01 to 2.00 μm was indicated by "○", that of 2.01 to 3.00 μm was indicated by "Δ" and that of over 3.01 μm was indicated by "×". The "×" signs are indicated for stamper with thickness of 0.02 mm since the thickness was too thin to perform pattern transfer, so the stamper was torn during the separation. As for the stamper with thicknesses of 0.05 mm and 0.04 mm, "○/Δ" are indicated in the similar reason as mentioned above, in view of strength as the stamper. In the case of a four-layer disc manufactured with a stamper thickness of 1.2 mm, defects were observed in the inner peripheral portion and the outer peripheral portion. The defects here mean floating partially arisen, and this floating caused the unevenness of spacer thickness increased. This unevenness is considered to be caused by a gap generated between the substrate and the stamper due to an influence of burr of the stamper.

TABLE 1

| | Stamper thickness (mm) | | | | | | | | | | |
|---|---|---|---|---|---|---|---|---|---|---|---|
| | 1.2 | 0.6 | 0.4 | 0.3 | 0.27 | 0.2 | 0.1 | 0.085 | 0.05 | 0.04 | 0.02 |
| Ni (Conventional Case) | — | — | — | X | — | — | — | — | — | — | — |
| Si | — | X | — | — | — | — | — | — | — | — | — |
| Polycarbonate | X | X | Δ | Δ | ○ | ⊚ | ⊚ | ○ | ○/Δ | ○/Δ | X |
| Polyolefin | X | X | Δ | Δ | ○ | ⊚ | ⊚ | ○ | ○/Δ | ○/Δ | X |

Regarding the polycarbonate and polyolefin, even when a base film (for example, PET film) formed to prevent occurrence of damages, stains or the like on one side is contained as a stamper thickness, the same result was obtained if each total thickness is the same. That is to say, when the stamper is formed of a plastic material, an effect to prevent the unevenness depends largely on the thickness and not on the material. Using a thin film translucency stamper having a thickness of 0.27 mm to 0.085 mm made it possible to form a space layer having a even thickness without being adversely affected by thickness unevenness, warp, burr or the like attributable to the substrate. It is preferable to use a thin film translucency stamper having a thickness of 0.20 mm to 0.1 mm in order to obtain a space layer having an even thickness.

As a result of observing part of thus manufactured four-layer disc in cross section, a shape shown in schematic views in FIGS. 3A and 3B was confirmed. The space layers were waved following a wave on the surface of the substrate. As a result, it was possible to form the space layers, each having an even thickness on the entire surface of the substrate despite of the wave on the surface of the substrate.

The above has described the disc having a four-layer information surface as an example, however, the present invention provides an effect to a multilayer disc as well as to the four-layer disc, such as to five-layer disc, six-layer disc, or the like.

Particularly, in a disc having an information surface of five or more layers, the space layers become thinner than those of the four-layer disc, and therefore the effect of the present invention is brought to the fore.

Evaluation was next performed on a reproduction characteristic of an optical disc manufactured by the method of the present invention using the thin film translucency stamper. The optical disc evaluated was a four-layer disc manufactured in such a manner that polycarbonate having a thickness of 0.1 mm is used as a stamper and a pattern is formed on the stamper using ultraviolet curable resin. As shown in FIG. 3B, the four-layer disc has a structure in which a cover layer 109, an information layer 108, a space layer 107, an information layer 106, a space layer 105, an information layer 104, a space layer 103 and an information layer 102 are sequentially arranged when viewed from a laser incident side. The information layers 108, 106, 104 and 102 were formed of Ag alloys having thicknesses of 5 nm, 10 nm, 15 nm and 50 nm, respectively, and the target thicknesses of the space layers 107, 105, and 103 were set to 12 μm, 9 μm, and 15 μm, respectively. The unevenness in thickness of each space layer 107, 105 and 103 between the maximum value and the minimum value was 1.4 μm, 1.1 μm and 1.7 μm, respectively.

For evaluation, there was used an optical disc drive having a semiconductor laser having a wavelength of 405 nm. A lens numerical aperture is 0.85. Reproduction light was set to 0.6 mW. First, focus and tracking were applied to the information layer 102, serving as a reference surface, which was the innermost layer seen from the laser. A radial tilt was changed from −0.8 to 0.8° and a radial tilt of 0.1°, at which the highest reproduced signal performance was obtained, was selected and used as a reference tilt of the disc. In this experiment, the reproduced signal performance was evaluated based on jitter caused at a reproduction time. However, it may be possible to use other reproduced signal evaluation indexes such degree of modulation, PRSNR, error rate, or the like.

Next, focus and tracking were applied to the information layer 104, which was the second innermost layer when viewed from the laser, and then a jump between layers was able to be performed without any problem. Likewise, an optimal tilt was measured up to the forefront information layer 108, with the result that a difference between the measured tilt of each layer and a reference tilt was within 0.1°. Reproduction was performed by use of this disc without executing reproduction tilt learning after the jump between layers, but jitter, which was almost equivalent to that obtained when the reproduction tilt learning was executed. Thus, the disc with small unevenness of tilt of each layer can omit learning time, and therefore there are advantages of the reduction of power consumption as well as short waiting time in addition to reduction in unevenness of the reproduction performance.

After that, a four-layer disc manufactured using a thin film translucency stamper formed of polycarbonate having a thickness of 0.3 mm was mounted on the aforementioned optical disc and focus and tracking were applied thereto. As a result of the experiment conducted in the same manner as mentioned above, in this disc, when a jump was made from the forefront layer to the second information layer 106 in a state that an optimal radial tilt was adjusted to the information layer 102, a jump error between layers occurred once every 15 times approximately. The target thicknesses of the space layers 107, 105, and 103 were set to 12 μm, 9 μm, and 15 μm, respectively. Unevenness in thickness of the respective spacers between the maximum value and the minimum value was 4.2 μm, 5.8 μm and 4.5 μm, respectively.

Further, in the same apparatus, focus and tracking were applied to a four-layer disc manufactured using a translucency stamper formed of polycarbonate having a thickness of 1.2 mm. The optimum radial tilt at the information layer 102 as a reference surface was −0.15, but it was found that the optimum tilt at each information layer changed in one round of the disc. Moreover, the unevenness of spacer thickness of the space layer was large in the disc inner peripheral portion and outer peripheral portion, and there was caused a problem that tracking was not applied or even when tracking was momentarily applied, but deviated easily. The target thicknesses of the space layers 107, 105 and 103 were set to 12 μm, 9 μm, and 15 μm, respectively. Unevenness in thickness of each layer between the maximum value and the minimum value was 4.3 μm, 6.5 μm and 4.8 μm, respectively.

In the above description, the innermost layer when viewed from the laser was used as the reference surface where the reference tilt was measured. However, the reference surface was arbitrarily selected, and even when a layer closest to the layer was selected as the reference surface, the similar result was obtained.

Figure 12:
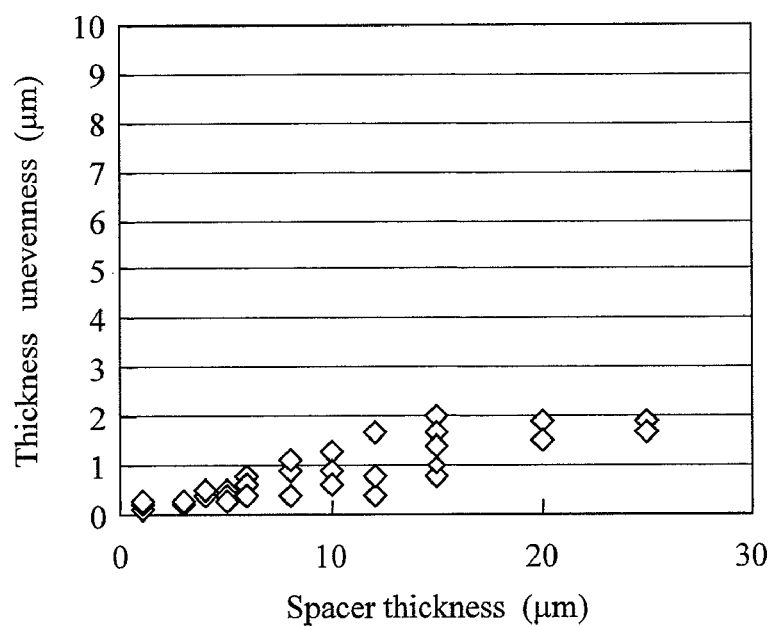
FIG. 12 is a view showing an example of thickness unevenness attributable to a spacer thickness according to the present invention.

FIG. 12 shows details on a measurement result of thickness unevenness of a four-layer disc. The four-layer disc was manufactured using a thin film translucency stamper having a thickness of 0.1 mm and a plastic substrate manufactured by an injection method. The disc structure is explained as follows. As shown in FIG. 4B, an Ag alloy having a thickness of 50 nm was deposited on a polycarbonate substrate by sputtering to form an information layer 102. Next, as shown in FIG. 4C, a translucency spacer 103 having a thickness of 15 μm was formed. A pit pattern corresponding to data of an information layer 104 was formed on the surface of the space layer. After that, as shown in FIG. 4D, an Ag alloy having a thickness of 15 nm was deposited on the resultant surface by sputtering to form an information layer 104. Next, as shown in FIG. 4E, a translucency spacer 105 having a thickness of 9 μm was formed. A pit pattern corresponding to data of an information layer 106 was formed on the surface of the space layer. As shown in FIG. 4F, an Ag alloy having a thickness of 10 nm was deposited on the resultant surface by sputtering to form an information layer 106. Further, as shown in FIG. 4G, a translucency spacer 107 having a thickness of 12 μm was formed, and as shown in FIG. 4H, an Ag alloy having a thickness of 5 nm was deposited on the resultant surface by sputtering to form an information layer 108. A pit pattern corresponding to the information layer 108 was formed on the surface of the space layer 107. Finally, as shown in FIG. 4I, a cover layer 109 having a thickness of 55 μm was formed.

In FIG. 12, a polycarbonate substrate having a thickness of 1.2 mm was used as a stamper in space layers having thicknesses of 20 μm and 25 μm, and a polycarbonate substrate having a thickness of 0.1 mm was used as a stamper in a space layer having a thickness of 15 μm or less.

In the space layer having a thickness of 15 μm less, the thickness unevenness was able to be reduced to 2 μm or less. Moreover, in a space layer having a thickness of 10 μm or less, the thickness unevenness was able to be reduced to 1.5 μm or less. Further, in a space layer having a thickness of 6 μm to 1 μm, the thickness unevenness was able to be reduced to 0.7 μm or less. The laser displacement meter manufactured by Keyence Corporation was used to measure the thickness of the space layer, and in an information zone range of each translucency spacer formed on the substrate, thicknesses of 456 points in total including 24 locations in a circumferential direction were measured every 2 mm between radii 23 mm to 59 mm, and a difference between a minimum value and a maximum value was taken as thickness unevenness. The displacement meter made by Keyence Corporation had insufficient resolution for measuring the thickness of 6 µm or less, and therefore a pre-measured thin translucent stamper thickness and a spacer thickness were measured together, and the thickness of the thin translucent stamper thickness was subtracted from the total thickness thereof to thereby obtain a spacer thickness.

Figure 13:
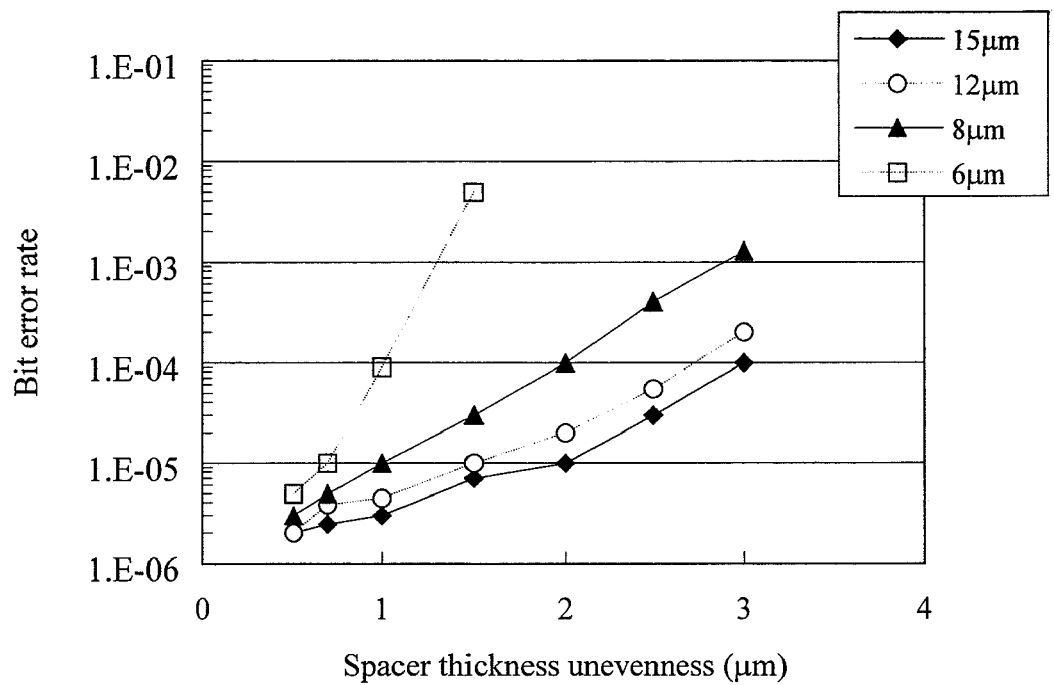
FIG. 13 is a view showing an example of evaluation of a multi-information-layer recording medium according to the present invention.

Next, an error rate was measured as a specific evaluation of each disc using the aforementioned drive. The error rate represents the number of signal (bit) errors that were not normally processed by a signal processing system when the certain number of signals (bits) was read. In an error code system, which is generally used at the present time, normal processing can be carried out without fail if the number of error signals is 10 or less among 100000 signals. For this reason, an error rate necessary for practical use is set to $1 \times 10^{-5}$ or less. Interlayer crosstalk was increased as the thickness of the space layer was decreased, and therefore it was assumed that specific measurement was performed with the number of apertures added. FIG. 13 shows a relationship between thickness unevenness and an error rate in connection with an average space layer thickness. The space layer and the thickness unevenness were pre-measured and thereafter an error rate of each disc was measured. From the result of the above measurement, it was found that the thickness unevenness was preferably 2 µm or less when the average spacer thickness was 15 µm in order to obtain a necessary error rate. Likewise, the thickness unevenness was set to 1.5 µm or less when the average spacer thickness was 12 µm. The thickness unevenness was set to 1 µm or less when the average spacer thickness was 8 µm. The thickness unevenness was set to 0.7 µm or less when the average spacer thickness was 6 µm. As a result, the error rate reached $1 \times 10^{-5}$ or less to make it possible to confirm a stable operation in the drive.

A four-layer disc, in which space layers each having substantially the same thickness as shown in FIG. 3A, was manufactured by the same method as mentioned above. Examination was performed on the disc in which the thickness of each spacer was almost 15 µm and each of unevenness of spacer thickness was about 1 µm. In this disc, the thickness unevenness was 3.0 µm in the total of three space layers (thickness unevenness between the information layer closest to the laser incident side and the information layer farthest therefrom). In this disc, tracking did not deviate even when the current BD drive was used, so that stable measurement was able to be carried out.

Moreover, discs were manufactured where each of the aforementioned spacer thicknesses was respectively increased by 1.5 µm. The discs were examined where three spacer thicknesses were 13.0 µm, 15 µm, and 16.5 µm respectively in order from the laser incident side, and each of thickness unevenness was 0.8 µm or less. The thickness unevenness of each layer was minimized, thereby obtaining an effect of suppressing occurrence of a so-called ghost spot where focus was achieved on a detector as in the original reproduced signal to generate serious interlayer crosstalk, which was unique to the multilayer medium having three or more information layers, with the result that a more satisfactory result was obtained.

Figure 10B:
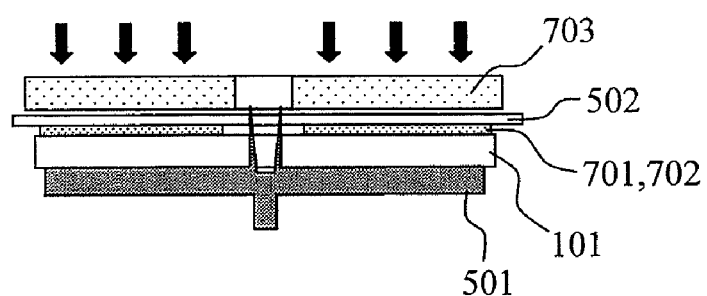

Further, processing time for the space layer formation was able to be shortened with using not only spinning but also a pressurization combined with the spinning, the pressurization being of the thin film translucency stamper 502 using a pressure plate as shown in FIG. 10B. Using a flexible pressure plate 703, for example, rubber-made pressure plate, made it possible to control the spacer thickness without being adversely affected by thickness unevenness, warp, burr or the like attributable to the substrate. The pressure at this time was set to 3 kg. Pressure was applied to the space layer in a range including an outer diameter 118 mm and an inner diameter 40 mm. Namely, the pressure is approximately 0.3 kg/cm$^2$. The pressure may be changed depending on the space layer material to be used or the target thickness.

Figure 10C:
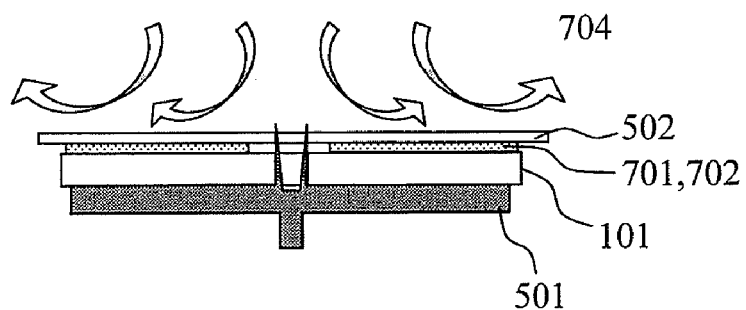

Further, the spacer thickness was able to be controlled even by a combination of pressurization of air pressure 704 and the spinning as shown in FIG. 10C. The air pressure at this time was set to 3 kg/cm$^2$. A dedicated blower holder was used so as to apply pressure to space layer in the range including the outer diameter 118 mm and the inner diameter 40 mm. The holder facing the disc had a plurality of holes, each having a diameter of 2 mm, for an air outlet such that pressure was made even in a target range. The air passed through the holes applies pressure. Moreover, even when a shape formed by spirally arranging lines, each having a width of 2 mm, was used as the air outlet instead of holes, the unevenness of spacer thickness was able to be reduced. The air pressure may be changed depending on the space layer material to be used or the target thickness. The thin film translucency stamper was able to be flexibly provided for the substrate surface, and therefore it was possible to achieve control using air pressure. This method is appropriate to simplify an apparatus configuration.

Figure 15A:
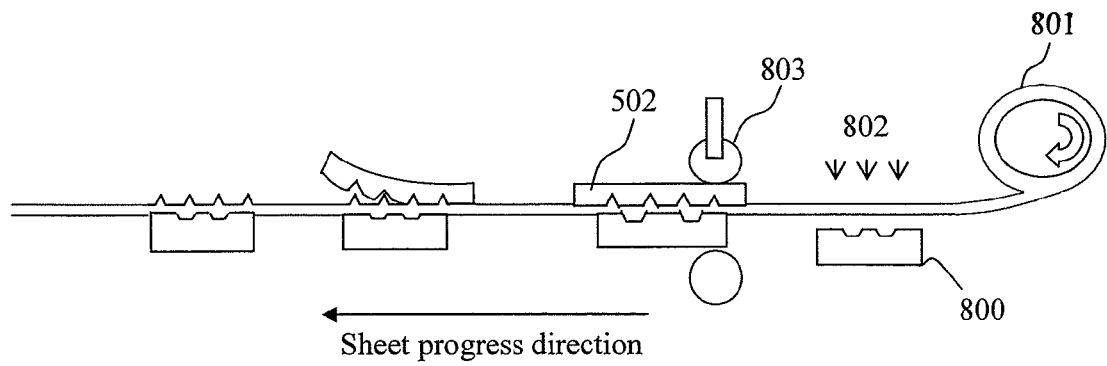
FIGS. 15A and 15B are cross-sectional views showing examples of a multi-information-layer recording medium manufacturing processes according to the present invention.
Figure 15B:
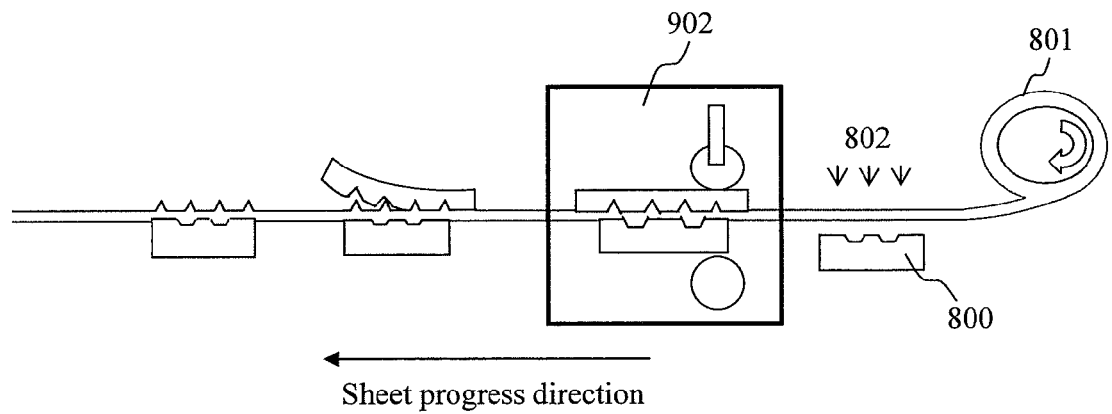

Explanation will be next given of an example using dry sheet as a space layer material. FIG. 15A shows a manufacturing method. Dry sheet 801 used is one that is manufactured by a combination of light curing and thermal curing. First, the dry sheet 801 was irradiated with light 802 and the resultant was sandwiched between a substrate 800 with information layers, and a thin film translucency stamper 502 having a thickness of 0.1 µm while being pressurized by a heated roller 803, so as to be superposed on the substrate. Since a roller surface is made of a flexible rubber material, the thin film translucency stamper and the dry sheet are adhered to each other along the substrate surface. After that, when the thin film translucency stamper was separated from the dry sheet, a space layer on which a stamper pattern was transferred was obtained on a dry sheet surface. In this way, it was possible to form a space layer having an even thickness without being adversely affected by thickness unevenness, warp, burr or the like attributable to the substrate. On adhering the thin film translucency stamper, the dry sheet and the substrate to one another, air incorporation can be prevented when adhesion is performed in reduced-pressure atmosphere. There is no need to keep the entire processes in the reduced-pressure atmosphere, and for example, only an adhering process may be kept in a decompression state 902 as shown in FIG. 15B. This method, using reduced-pressure atmosphere is the same method as the one when the thin film translucency stamper is manufactured shown in FIG. 8, and the same effect can be obtained.

As the dry sheet material, there were used the materials composed of thermoplastic resin, a cation-polymerizable compound, and a photocationic polymerization initiator. The dry sheet is irradiated with light, thereby triggering a curing reaction. Thereafter the dry sheet is heated to cause softening, so that the resultant is filled in the stamper pattern and rapidly cured at the same time. Therefore the dray sheet is cured in a shorter time and with a higher reactivity as compared with curing only by heating. At the time of separating the stamper, an adhesive sheet is already cured so that there is no risk of breakage of physical patterns, and therefore it is possible to separate the stamper clearly.

As the thermoplastic resin, there is used common thermoplastic resin that is generally employed as a hot-melt adhesive. The thermoplastic resin includes, for example, polyester resin, polyolefin resin, polyether resin, polyacetal resin, acrylic resin, urethane resin, block copolymer resin or the like. But it is not particularly limited, and multiple types of resins can be used in accordance with use conditions.

Moreover, as the cation-polymerizable compound to be used in the present invention, it is possible to use various types of monomers, oligomers, or polymers containing cation-polymerizable functional groups such as epoxy group, vinyl ether group, hydroxyl group, episulfide group, ethyleneimine group or the like in the molecule. Further, it is possible to use the aforementioned thermoplastic resin containing these functional groups.

The cation-polymerizable compound may be used alone or in combination with two or more types. It is preferable to use a cation-polymerizable compound having an epoxy group where reactivity is high and curing time is short. As examples of epoxy resin, bisphenol-A glycidyl ether type, bisphenol-F glycidyl ether type, phenol novolac glycidyl ether type, cresol novolac glycidyl ether type, glycidylamine, and the like are cited, but it is not limited to these types. Further, the aforementioned epoxy resin may be used together with a compound having an oxetane group in order to increase a reaction rate.

As the polymerization initiator to be used in the present invention, a photocationic type is preferable. When a photoradical polymerization initiator would be used, radical species are activated only during light irradiation, so the opaque stamper such as Ni or the like cannot be used. In the case of using thermal radical and thermal cationic polymerization initiators, heating is required for long time, thus arising a problem in workability.

As the photocationic polymerization initiator, any one of an ionic photoacid generation-type and a non-ionic photoacid generation-type may be used. As the ionic photoacid generation-type, there can be used onium salts such as aromatic diazonium salt, aromatic halonium salt, aromatic sulfonium salt, or the like, organic metal complexes such as iron-allene complex, titanocene complex, arylsilanol-aluminum complex, or the like. As the non-ionic photoacid generation-type, there can be used nitrobenzyl ester, sulfonic acid derivative, phosphoric acid ester, phenolsulfonic acid ester, diazonaphthoquinone, N-hydroxyimide sulfonate, or the like. The photocationic polymerization initiator may be used alone or in combination with two or more types. It is preferable that the photocationic polymerization initiator be added to the cation-polymerizable compound in the range of 0.5 to 10 wt. %. There is a problem that if the added amount is below 0.5 wt. % or less, the adhesive sheet is not sufficiently cured and if it is over 10 wt. %, the adhesive sheet is cured immediately after it is irradiated with light.

Even in the dry sheet formed at a fixed film thickness, when the substrate is distorted or burrs are formed on the inner periphery and outer periphery, even pressurization cannot be applied to the entire information region, so that thickness unevenness due to floating and pattern transfer defects are caused. An explanation will be given of a relationship between a stamper thickness and a reproduction characteristic examined as an evaluation of pattern transfer using FIG. 18. A four-layer disk of BD-ROM density was manufactured to be used as a stamper using polyolefin-made stampers (nine types having thicknesses of 0.04 to 0.6 mm) used in Table 1, and an information layer closest to the laser irradiation side was reproduced using the aforementioned drive having a laser with a wavelength of 405 nm. The information layer closest to the laser irradiation side is deposited after three space layers are layered. Therefore when information is reproduced from a cover layer side as in BD, the information layer is most is susceptible to unevenness of spacer thickness. In this embodiment, reproduction performance of the entire disc surface was measured to examine the unevenness. Here, jitter was used as a reduction performance index.

Figure 18:
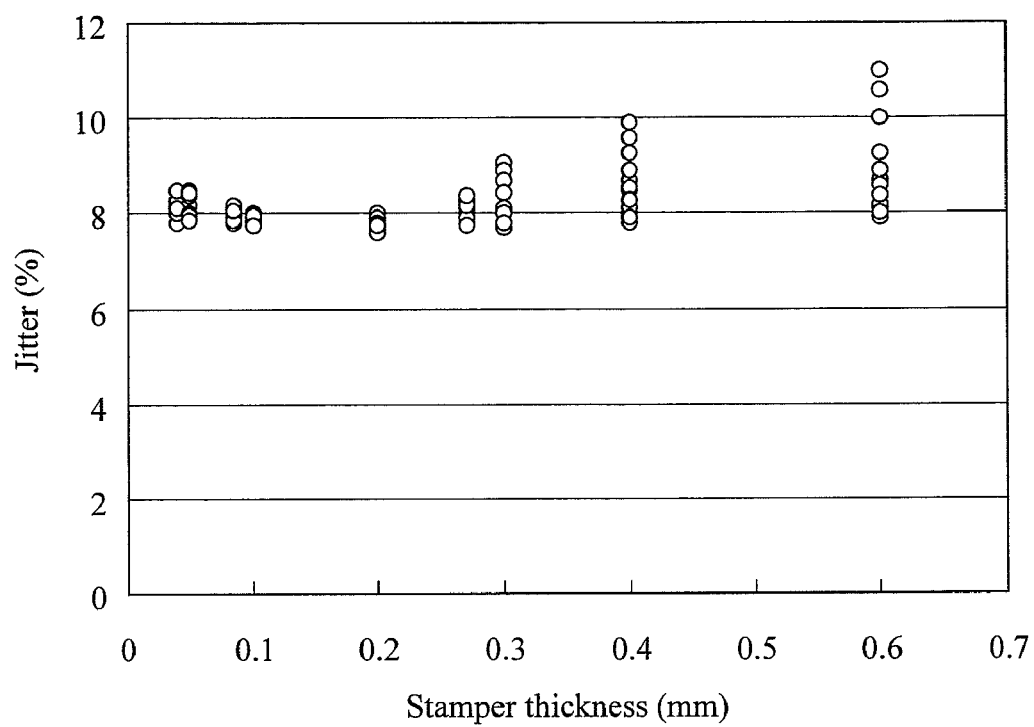
FIG. 18 is a view showing an example of evaluation of a multi-information-layer recording medium according to the present invention.

As seen from FIG. 18, when the stamper thickness was 0.27 mm or less, good jitter of 8.5% or less was able to be obtained. In the BD-ROM standard, a jitter upper limit of a semi-translucent layer of a two-layer disc is set to 8.5% so when the value is 8.5% or less, the value is practical as reproduction performance. The stamper thickness of 0.085 to 0.2 mm is preferable since jitter unevenness is small and data transferability is good. In the case of the stamper thickness of 0.27 mm, jitter unevenness is slightly higher than that in the disc manufactured using the stamper having a thickness of 0.2 mm. However, the maximum jitter is 8.4%, which is in the range of 8.5% or less, and therefore this is the stamper thickness durable enough for practical use. However, in the disc manufactured using the stamper having a thickness of 0.3 mm or more, the measured maximum jitter is over 8.5% and it is shown that transfer of the information pit is poor depending on the location. Accordingly, the stamper thickness may be 0.27 mm or less. In the discs manufactured having the stamper thicknesses of 0.04 mm and 0.05 mm, respectively, the maximum jitter was 8.5%, which had a reproduction performance durable enough for practical use. However, this caused a problem at the manufacturing of the disc that the stamper was broken, resulting in failure in deposition. Accordingly, the stamper thickness may be 0.085 mm or more.

In addition, even when the aforementioned dry sheet was used as the thin film translucency stamper, a result equivalent to that described above was obtained without any problem.

An explanation will be next given of an example in which the present invention is applied to multilayer SIL. A four-layer medium was manufactured by the following steps. The manufacturing method of the stamper of each layer and the translucency spacer is substantially the same as the method using the ultraviolet curable resin mentioned in the above embodiment, and a difference therebetween is that a pattern corresponding to a data pit is recorded using an electron beam. Regarding data, similar to Blu-ray Disc, binary data was converted by 1-7PP modulation and a window width was set to 40 nm. A track pitch was set to 170 nm. Other conditions were the same as those in Blu-ray Disc.

As shown in FIGS. 4A to 4I, by the injection method, there was formed a polycarbonate substrate having a thickness of 1.1 mm and a diameter of 120 mm on which a pit pattern of data of a layer farthest from a light incident surface was formed. An Ag alloy having a thickness of 50 nm was deposited on the substrate by sputtering to form an information layer 102. Next, a translucency spacer 103 having a thickness of 2.4 µm was formed. A pit pattern corresponding to data of an information layer 104 was formed on a surface of the translucency spacer. An Ag alloy having a thickness of 15 nm was deposited on the surface. Next, a translucency spacer 105 having a thickness of 2.2 µm was formed. A pit pattern corresponding to data of an information layer 106 was formed on a surface of the translucency spacer. An Ag alloy having a thickness of 10 nm was deposited on the surface. After that, a translucency spacer 107 having a thickness of 2.6 µm was formed. A pit pattern corresponding to data of an information layer 108 was formed on a surface of the space layer. An Ag alloy having a thickness of 5 nm was deposited on the surface. Finally, a cover layer 109 having a thickness of 2.0 µm was formed by the spin method.

An SIL having NA of 1.6 was manufactured and mounted on an actuator. Control was performed such that a distance between a medium and a lens was maintained to be 20 nm or less. The control method will be described below. Reflected light from the medium was converted into an electrical signal by a light detector and the signal was separated into two. One signal thus separated was used as a reproduced signal and the other was used for distance control. A distance control signal was passed through a high level interception filter having a cut-off frequency of 10 kHz. A lens actuator was moved to the position to obtain the signal level within a specified value. The high level interception filter can intercept a frequency region of a data signal from the distance control signal. In this case, a variation in signal level appears as a change in coupling efficiency in which the variation in distance between the lens and the medium causes an optical near field to convert into propagation light. The coupling efficiency strongly depends on the distance between the lens and the medium. Accordingly, the actuator is moved to the position to set the signal level within a predetermined range, thereby making it possible to maintain the constant distance between the lens and the medium. The predetermined range was set such that the distance between the lens and medium was within a range of 10 nm or more and 20 nm or less once a relationship between the distance between the lens and the medium and the signal level to be obtained was measured in advance.

An interlayer distance of the manufactured medium was measured by a laser interferometer using SIL. As a result, the thickness unevenness of all the layers was 0.1 µm or less in the entire region of a disc radius in a range of 23 mm to 58 mm. As a result of measurement of the bit error rate of this disc, maximum bit error rates in the entire regions of the respective layers were $8 \times 10^{-6}$, $6 \times 10^{-6}$, $5 \times 10^{-6}$, and $2 \times 10^{-6}$ in order from the farthest layer from the light incident side.

Figure 14:
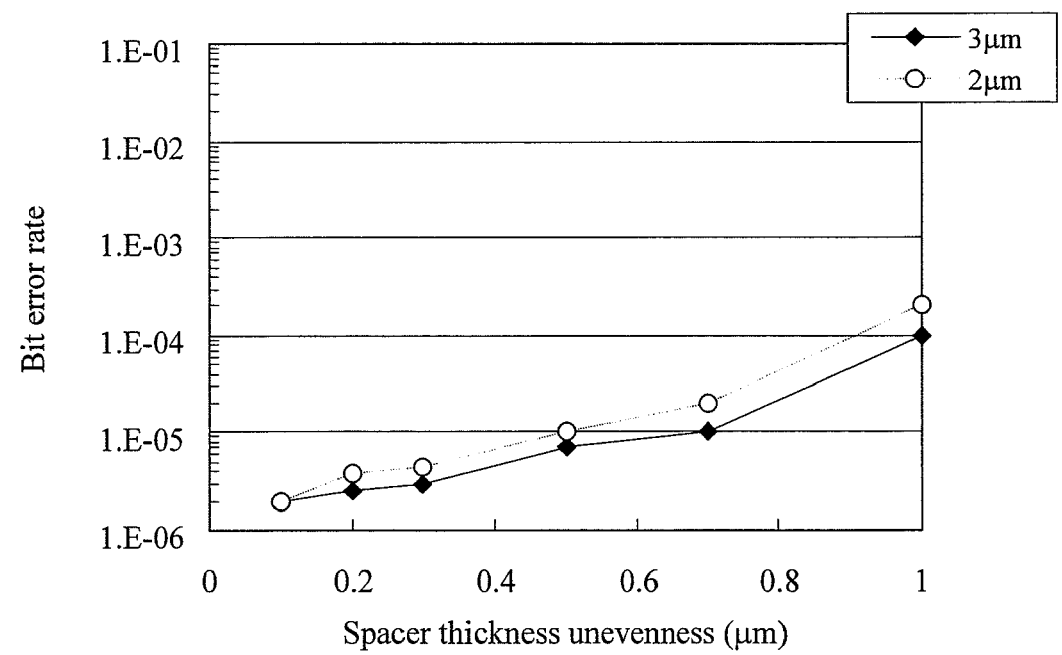
FIG. 14 is a view showing an example of evaluation of a multi-information-layer recording medium according to the present invention.

FIG. 14 shows a relationship between thickness unevenness and an error rate with respect to an interlayer distance. It was shown from this result that the thickness unevenness was desirably set to 0.5 µm or less when the average thicknesses of the space layers were 2 µm and 3 µm, in order to obtain a required error rate.

Moreover, the substrate 101 was formed of a laminated structure composed of at least two materials to obtain a good performance even in a fine pattern. In general, as a substrate, there was used polycarbonate on which physical patterns were transferred by the injection method. However, when fine physical patterns were to be transferred, the patterns were transferred by 2P method having better transferability than that of the conventional injection method. By way of example, manufacturing was performed by the spin method same as that used in FIG. 9. As physical patterns transfer layer, Ultraviolet curable resin and SD301 (manufactured by Dainippon Ink and Chemicals Co., Ltd.) were coated on the surface of the substrate manufactured by the injection method and a thin film translucency stamper having a thickness of 0.1 mm was used as a mother die. For improving releasability, an $Al_2O_3$ film having a thickness of 10 nm was formed on the surface of the thin film translucency stamper.

Figure 16:
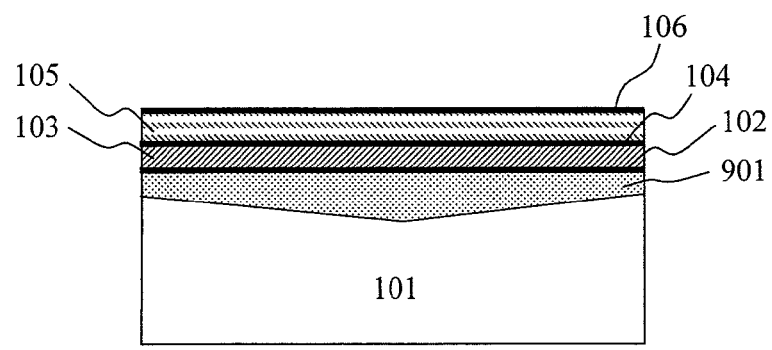
FIG. 16 is a cross-sectional view showing an example of a multi-information-layer recording medium according to the present invention.

FIG. 16 is a cross-sectional schematic view showing a substrate having a two-layer structure and part of a multi-information-layer recording medium having a translucency spacer formed thereon. Since a refractive index of physical patterns transfer layer 901 and that of the substrate 101 are almost the same, no light is scattered at the boundary therebetween to adversely affect reading of the multilayer medium. Deposition is made on a surface on which physical patterns are newly transferred, to serve this surface as an information layer 102. This made it possible to obtain a substrate shape such that no adverse influences of warp, burr and the like attributable to the injection substrate was exerted at the same time with physical patterns transfer. Here, a substrate having a diameter of 120 mm and a thickness of 1.1 mm was used and the substrate thicknesses were measured at 12 points in a circle around a radius of 55 mm by a micro gauge. As a result, although the substrate thickness unevenness just after injection was 8 µm, the substrate thickness unevenness was 1.5 µm after the physical patterns were transferred using a thin film translucency stamper having a thickness of 0.1 mm.

Figure 17:
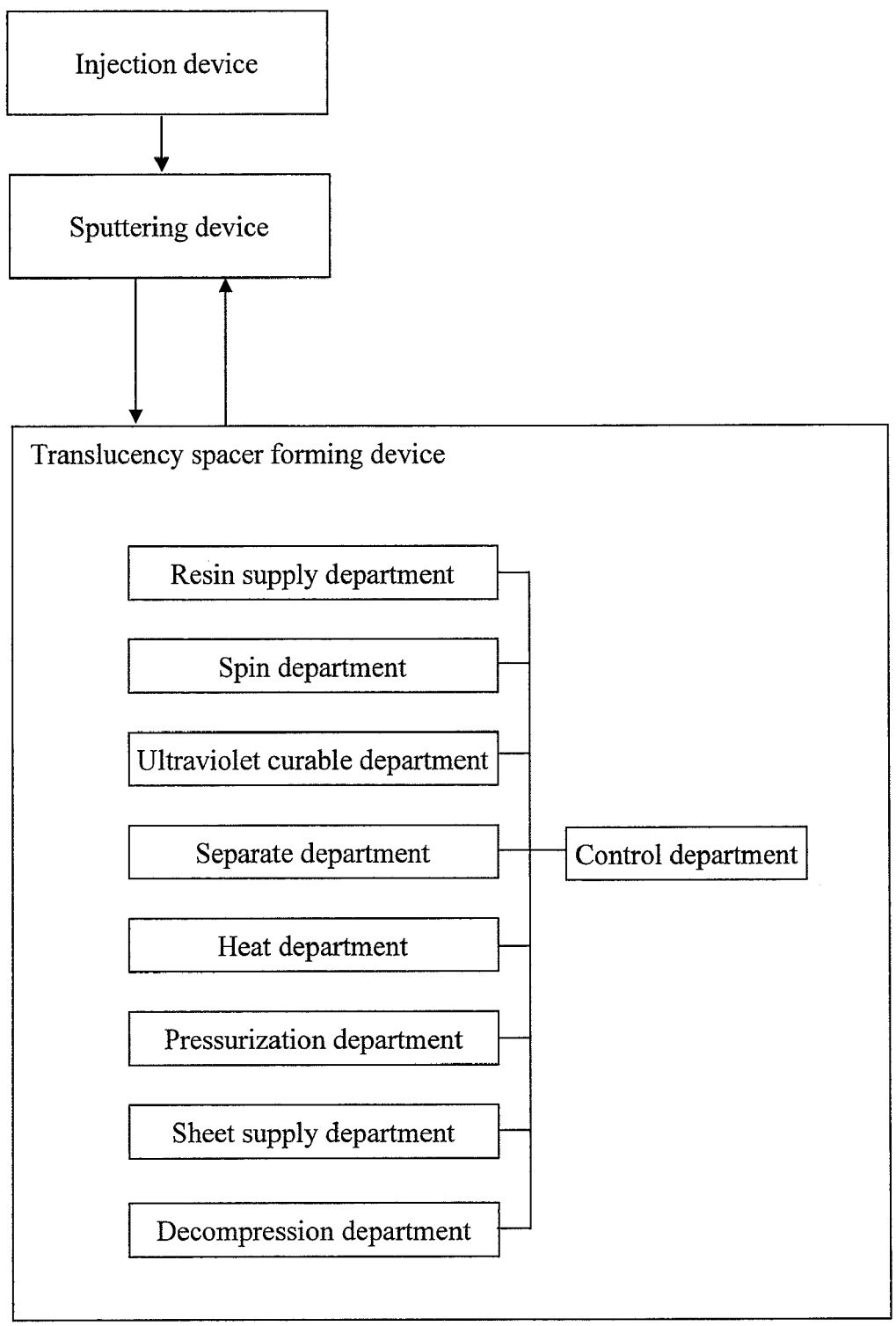
FIG. 17 is a view showing an example of a configuration of a manufacturing device according to the present invention.

An explanation will be given of an example of a configuration of a manufacturing apparatus according to the present invention using FIG. 17. The manufacturing apparatus shown in FIG. 17 is composed of a substrate forming device, an information layer deposition device, and a translucency spacer forming device. The substrate forming device manufactures a polycarbonate substrate using an injection device. The information layer deposition device deposits an information layer, a reflective layer, a protective layer and the like using a sputtering device. The translucency spacer forming device forms a space layer and a cover layer of a multilayer medium. As shown in the FIG. 17, the respective functions such as a resin supply department, a spin department, an ultraviolet curable department, a separate department, a heat department, a pressurization department, a sheet supply department, and a decompression department are controlled to drive by a control department.

What is claimed is:

1. A multi-information-layer recording medium comprising:
    a plastic substrate manufactured by an injection method, and having physical patterns on its surface;
    a first information recording layer formed on the substrate; and
    at least one set of a translucency spacer, layered on the first information recording layer and having physical patterns on its surface, and an information recording layer formed on the translucency spacer,
    wherein an average thickness of the translucency spacer in an information zone is not more than 15 µm and a difference between a minimum value and a maximum value in a thickness of the translucency spacer is not more than 2 µm; and
    wherein when the average thickness of the translucency spacer in the information zone is not more than 3 µm, the difference between the minimum value and the maximum value in the thickness of the translucency spacer is not more than 0.5 µm.

2. The multi-information-layer recording medium according to claim 1, wherein at least one layer of the translucency spacer has a layered structure where a plurality of layers are laminated.

3. The multi-information-layer recording medium according to claim 1, wherein the substrate has a layered structure having at least two materials.

4. A multi-information-layer recording medium manufacturing process comprising steps of:
    molding a plastic substrate having physical patterns on a surface by an injection method;
    depositing a first information layer on the substrate;
    superposing a flexible sheet stamper on the first information layer with a liquid ultraviolet curable resin layer sandwiched therebetween, the flexible sheet stamper having a thickness of not less than 0.085 mm and not more than 0.27 mm, a translucency, and physical patterns formed on its lower surface;

spinning the substrate with the ultraviolet curable resin layer sandwiched between the stamper and the substrate so as to adjust a thickness of the ultraviolet curable resin layer;

irradiating the ultraviolet curable resin layer with ultraviolet light through the stamper so as to cure the ultraviolet curable resin layer;

separating the stamper; and depositing an information layer on a translucency spacer formed of the cured ultraviolet curable resin layer, wherein the step of depositing an information layer on the translucency spacer is repeated to form a plurality of information layers separated from one another by the translucency spacer.

5. The multi-information-layer recording medium manufacturing process according to claim 4, wherein a thickness of the stamper is not less than 0.1 mm and not more than 0.2 mm.

6. The multi-information-layer recording medium manufacturing process according to claim 4, wherein an average thickness of the translucency spacer in an information zone is not more than 15 μm and a difference between a minimum value and a maximum value in a thickness of the translucency spacer is not more than 2 μm.

7. The multi-information-layer recording medium manufacturing process according to claim 4, wherein the stamper is made of an organic compound.

8. The multi-information-layer recording medium manufacturing process according to claim 4, wherein the stamper is formed of mainly an organic compound and has a laminated structure of the organic compound and any one of an organic compound and an inorganic compound.

9. The multi-information-layer recording medium manufacturing process according to claim 4, wherein the stamper is pressurized by a flexible pressurizing plate while the substrate is spun in the step of adjusting the thickness of the ultraviolet curable resin layer.

10. The multi-information-layer recording medium manufacturing process according to claim 4, wherein the stamper is pressurized by an air pressure while the substrate is spun in the step of adjusting the thickness of the ultraviolet curable resin layer.

11. The multi-information-layer recording medium manufacturing process according to claim 4, wherein the step of superposing the stamper on the information layer with the liquid ultraviolet curable resin layer sandwiched therebetween is performed in vacuum atmosphere.

12. The multi-information-layer recording medium manufacturing process according to claim 6, wherein when the average thickness of the translucency spacer in the information zone is not more than 3 μm, the difference between the minimum value and the maximum value in the thickness of the translucency spacer is not more than 0.5 μm.

* * * * *